(12) United States Patent
Bobier-Tiu

(10) Patent No.: US 11,801,844 B2
(45) Date of Patent: Oct. 31, 2023

(54) SYSTEMS AND METHODS FOR FRICTION ESTIMATIONS USING BINS AND DYNAMIC ENVELOPES

(71) Applicant: TOYOTA RESEARCH INSTITUTE, INC., Los Altos, CA (US)

(72) Inventor: Carrie Bobier-Tiu, Sunnyvale, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 319 days.

(21) Appl. No.: 16/734,284

(22) Filed: Jan. 3, 2020

(65) Prior Publication Data

US 2021/0206379 A1    Jul. 8, 2021

(51) Int. Cl.
| | | |
|---|---|---|
| *B60W 40/068* | (2012.01) | |
| *B60W 30/02* | (2012.01) | |
| *G06T 17/10* | (2006.01) | |
| *B60T 8/1755* | (2006.01) | |

(52) U.S. Cl.
CPC ....... *B60W 40/068* (2013.01); *B60T 8/17551* (2013.01); *B60W 30/02* (2013.01); *G06T 17/10* (2013.01); *B60T 2210/12* (2013.01); *G06T 2210/12* (2013.01)

(58) Field of Classification Search
CPC .................................................. B60W 40/068
See application file for complete search history.

(56) References Cited

U.S. PATENT DOCUMENTS

| | | | |
|---|---|---|---|
| 7,681,960 B2 | 3/2010 | Wanke | |
| 8,914,213 B2 | 12/2014 | Chimner | |
| 9,043,111 B2 | 5/2015 | Dagenais | |
| 2004/0138831 A1* | 7/2004 | Watanabe | B60T 8/1725 702/33 |

(Continued)

OTHER PUBLICATIONS

Liu, K. et al., Model Predictive Stabilization Control of High-Speed Autonomous Ground Vehicles Considering the Effect of Road Topography, Applied Sciences, May 19, 2018, pp. 1-16, vol. 8, issue 822.

(Continued)

*Primary Examiner* — Imran K Mustafa
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods for controlling a vehicle using operational constraints, including friction estimates are disclosed. Friction estimation include estimating a tire-road coefficient of friction using bins and envelopes. Bounding envelopes are configured to ensure that stability of the vehicle is maintained. The friction estimate is used to define the bounding envelopes. Further, the bounding envelopes are received as feedback into the friction estimation, itself. Based on the bounding envelope, the friction estimation can be adjusted. Then, the adjusted friction estimation can be fed back to reshape the bounding envelopes. Multiple bins can be used to evaluate an operating range of friction. Each bin can be used to compare actual vehicle dynamics with expected dynamics based on the estimation using the range assigned to that bin. Multiple bins and multiple controllers can run in parallel to re-estimate friction considering the vehicle dynamics over time.

20 Claims, 15 Drawing Sheets

(56) References Cited

U.S. PATENT DOCUMENTS

| | | | |
|---|---|---|---|
| 2014/0114547 A1* | 4/2014 | Chimner | B60W 40/068 |
| | | | 701/73 |
| 2017/0101095 A1* | 4/2017 | Nilsson | B60W 30/143 |
| 2018/0126997 A1* | 5/2018 | Offenhaeuser | G08G 1/0112 |
| 2020/0262439 A1* | 8/2020 | Wyciechowski | B60W 30/02 |

OTHER PUBLICATIONS

Bobier-Tiu, C. G. et al., Vehicle control synthesis using phase portraits of planar dynamics, Vehicle System Dynamics, International Journal of Vehicle Mechanics and Mobility, Jul. 26, 2018, pp. 1318-1337, vol. 57, issue 9, Taylor & Francis Group.

Bobier, C. G. et al., Staying Within the Nullcline Boundary for Vehicle Envelope Control Using A Sliding Surface, Vehicle System Dynamics, Aug. 22, 2012, pp. 1-20, Taylor & Francis.

Bobier, C. G. et al., Sliding Surface Vehicle Envelope Control: A Cooperative Design Between Controller and Envelope, 2012 American Control Conference, Jun. 27-28, 2012, pp. 6521-6526, Montreal, Canada.

Bobier, C. G. et al., Sliding Surface Envelope Control: Keeping the Vehicle Within a Safe State-Space Boundary, ASME. Dynamic Systems and Control Conference, ASME 2010 Dynamic Systems and Control Conference, 2010, pp. 1-8.

Bobier, C. G. et al., Envelope Control: Stabilizing within the Limits of Handling Using a Sliding Surface, 6th IFAC Symposium Advances in Automotive Control, Jul. 12-14, 2010, pp. 162-167, IFAC, Munich, Germany.

Beal, C. E., Stabilization of a Vehicle Traversing a Short Low-Friction Road Segment, 2017 IEEE Conference on Control Technology and Applications (CCTA), Aug. 27-30, 2017, pp. 1898-1903, IEEE, Kohala Coast, Hawai'i, USA.

Beal, C. E. et al., Model Predictive Control for Vehicle Stabilization at the Limits of Handling, IEEE Transactions on Control Systems Technology, Jul. 2013, pp. 1258-1269, vol. 21, issue. 4, IEEE.

Beal, C. E., Applications of Model Predictive Control to Vehicle Dynamics for Active Safety and Stability, A Dissertation Submitted to the Department of Mechanical Engineering and the Committee on Graduate Studies of Stanford University in Partial Fulfillment of the Requirements for the Degree of Doctor of Philosophy, Jul. 2011, pp. 1-155, Stanford University.

Bobier, C. G., A Phase Portrait Approach to Vehicle Stabilization and Envelope Control, A Dissertation Submitted to the Department of Mechanical Engineering and the Committee on Graduate Studies of Stanford University in Partial Fulfillment of the Requirements for the Degree of Doctor of Philosophy, Aug. 2012, pp. 1-40, Stanford University.

Laurense, V. A. et al., Path-Tracking for Autonomous Vehicles at the Limit of Friction, 2017 American Control Conference (ACC), May 24-27, 2017, pp. 5586-5591, ACC, Seattle, WA, USA.

Laurense, V. A. et al., Speed Control for Robust Path-Tracking for Automated Vehicles at the Tire-Road Friction Limit, 14th International Symposium on Advanced Vehicle Control (AVEC 2018), Jul. 11, 2018, pp. 1-6, AVEC.

* cited by examiner

SYSTEMS AND METHODS FOR FRICTION ESTIMATIONS USING BINS AND DYNAMIC ENVELOPES

TECHNICAL FIELD

The present disclosure relates to systems and methods of a vehicle for partially controlling operation of a vehicle based. Some embodiments relate to partially controlling operation of the vehicle using operational constraints of the vehicle based on operational contextual constraints, such as estimations of friction.

BACKGROUND

Drivers may often be unaware of a vehicle's operational constraints or contextual constraints of an environment while driving. A driver may unmindfully make driving decisions that near or exceed the limits of the vehicle's operational constraints, which may result in a vehicle catastrophe of some sort. Furthermore, the driver may not have complete awareness of their contextual environment.

BRIEF SUMMARY OF EMBODIMENTS

According to various embodiments in the disclosed technology, a vehicle uses operational information and contextual information to determine a vehicle's operational constraints, contextual constraints, and current vehicle state given output signals of sensors within the vehicle. Future vehicle states may be predicted based on the current vehicle state. Based on the vehicle's operational constraints, contextual constraints, and future vehicle states predicted, the vehicle may control the vehicle such that a driver's operational input is corrected to avoid vehicle catastrophes.

One aspect of the present disclosure relates to a vehicle configured for partially controlling operation of a vehicle based on operational constraints of the vehicle and/or contextual constraints. The vehicle may include one or more hardware processors configured by machine-readable instructions or other circuits to perform the functions. Sensors may be configured to generate output signals conveying operational information regarding the vehicle. The sensors may include in-vehicle sensors or extra-vehicular sensors such as, for example, infrastructure sensors or sensors within other vehicles.

The operational information may include values of operational parameters of the vehicle. The sensors may be configured to generate output signals conveying contextual information. The processor(s) (or other circuitry) may be configured to determine, based on the output signals, the operational information. The processor(s) may be configured to determine, based on the output signals, the contextual information. The processor(s) may be configured to determine, based on the operational information and/or the contextual information, a current vehicle state of the vehicle. The current vehicle state may represent current values of the operational parameters of the vehicle and/or values of the contextual parameters of the vehicle. The processor(s) may be configured to determine, based on the current vehicle state, a future vehicle state of the vehicle. The processor(s) may be configured to determine, based on the operational information, predicted boundaries of the operational information. A breach of the predicted boundaries may indicate undesirable values of the operational parameters of the vehicle such that the values are nearing the operational constraints of the vehicle. The processor(s) may be configured to determine, based on the operational information and contextual information, predicted threshold values of a trajectory metric. The predicted threshold values of the trajectory metric may represent desirable circumventions in order to avoid causing vehicle catastrophes. The processor(s) may be configured to control the vehicle. Controlling the vehicle may be based on the future vehicle state determined, the predicted boundaries of the operational information, and the predicted trajectory threshold values. The processor(s) may be configured to control the vehicle partially such that effectuation of a determined corrective response may be in coordination with the driver's control of the vehicle. The driver may maintain a majority of control of the vehicle during such control of the vehicle.

As used herein, the term "determine" (and derivatives thereof) may include measure, calculate, compute, estimate, approximate, generate, and/or otherwise derive, and/or any combination thereof.

One aspect of the present disclosure relates to a method for partially controlling operation of a vehicle based on operational constraints of the vehicle and/or contextual constraints of the vehicle. The method may include generating output signals conveying operational information regarding the vehicle. The operational information may include values of operational parameters of the vehicle. The method may include generating output signals conveying contextual information. The contextual information may include values of contextual parameters of the vehicle. The method may include determining, based on the output signals, the operational information. The method may include determining, based on the output signals, the contextual information. The method may include determining, based on the operational information and/or the contextual information, a current vehicle state of the vehicle. The current vehicle state may represent current values of the operational parameters of the vehicle and/or values of the contextual parameters of the vehicle. The method may include determining, based on the current vehicle state, a future vehicle state of the vehicle. The method may include determining, based on the operational information, predicted boundaries of the operational information. A breach of the predicted boundaries may indicate undesirable values of the operational parameters of the vehicle such that the values are nearing the operational constraints of the vehicle. The method may include determining, based on the operational information and contextual information, predicted threshold values of a trajectory metric. The predicted threshold values of the trajectory metric may represent desirable circumventions in order to avoid causing vehicle catastrophes. The method may include controlling the vehicle. Controlling the vehicle may be based on the future vehicle state determined, the predicted boundaries of the operational information determined, and the predicted trajectory threshold values determined. The method may include controlling the vehicle partially such that effectuation of a determined corrective response may be in coordination with the driver's control of the vehicle. The driver may maintain a majority of control of the vehicle during such control of the vehicle.

In accordance with another embodiment of the disclosed technology, a method for controlling the vehicle can include providing an initial friction estimate as input to calculate bounding envelopes. Then, receiving the bounding envelopes as feedback. The bounding envelopes can be dynamically defined by the initial friction estimate, for example by comparing actual vehicle behavior to the bounding envelopes defined by the initial friction estimate. In response to determining a mismatch between the actual vehicle behavior and the boundary envelopes, the friction estimate may be adjusted based on the bounding envelopes received as feedback. The adjusted friction estimate may be provided as feedback to recalculate the bounding envelopes. A vehicle control and/or stabilization action can be initialized based on the adjusted friction estimate and the recalculated bounding envelope.

Yet another aspect of the present disclosure can relate to a method for controlling a vehicle based on a dynamic friction estimate using multiple bins running concurrently. The method can include providing an initial friction estimate as input to calculate bounding envelopes. Then, the bounding envelopes can be received as feedback, as the bounding envelopes are dynamically defined by the initial friction estimate. A plurality of friction bins can be created to evaluate a plurality of friction ranges, in response to determining a mismatch between an actual vehicle behavior and the boundary envelopes. Each of the plurality of friction ranges may be assigned to a corresponding one of the plurality of friction bins. A friction bin can be selected from the plurality of friction bins based on the evaluation of each friction range corresponding to each friction bin. The selected friction bin may bound a vehicle state response based on the bounding envelopes received as feedback.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The technology disclosed herein, in accordance with one or more various implementations, is described in detail with reference to the following figures. The figures are provided for purposes of illustration only and merely depict typical or example implementations of the disclosed technology. These figures are provided to facilitate the reader's understanding of the disclosed technology and shall not be considered limiting of the breadth, scope, or applicability thereof. It should be noted that for clarity and ease of illustration these figures are not necessarily made to scale.

Figure 1:
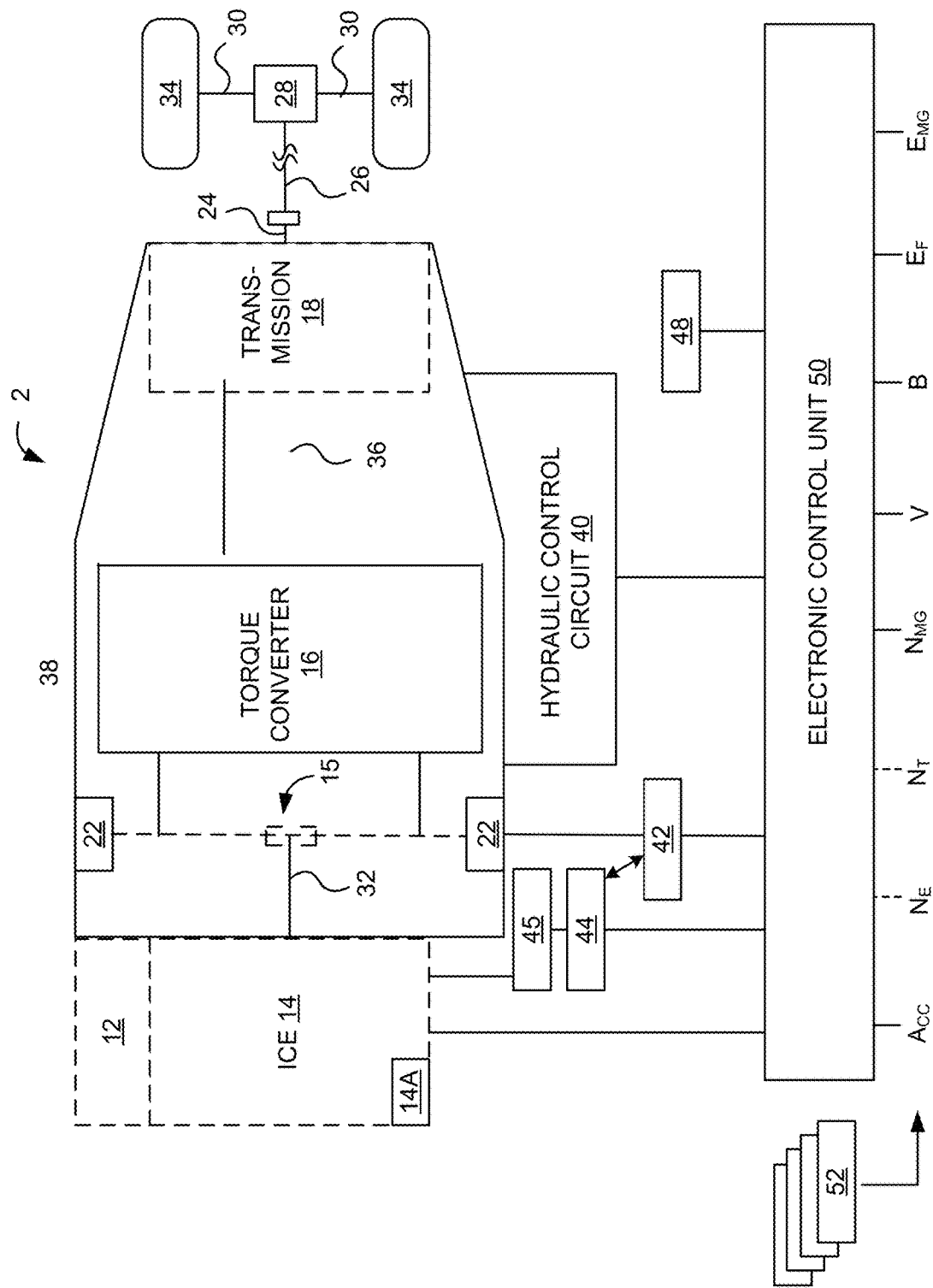
FIG. 1 illustrates an example vehicle with which embodiments of the disclosure may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Accidents, in which a driver loses control of the vehicle, are often times caused by a miscalculated action of the driver. Further, these miscalculations by a driver can be exacerbated by a sudden change in the road surface. Recent years have seen several technologies arise in an attempt to decrease accident rates, one of which is Electronic Stability Control. Some existing ESC systems, while providing stabilization of the vehicle, function without full knowledge of the vehicle states or tire-road coefficient of friction (i.e., µ).

The present disclosure is directed to systems and methods that implements a more holistic vehicle control system for providing vehicle safety and stabilization, including enhanced safety features such as Vehicle Envelope Control. Vehicle Envelope Control can integrate the improved awareness capabilities of vehicles, such as the vehicle's multiple sensors and actuators, to keep the vehicle within a safe operating regime. Furthermore, Vehicle Envelope Control can stabilize the car by keeping it within a safe region (e.g., safe region of the yaw rate-sideslip state space).

In addition, the disclosed vehicle control system includes enhanced friction estimation features, that are particularly designed to provide an enhance estimation of a tire-road coefficient of friction. As alluded to above, tire-road conditions can be a contributing factor to car instability and even accidents, thus considering the tire-road coefficient of friction (i.e., µ) can be critical to improving safety in vehicle control systems. However, as alluded to above, many existing vehicle control systems, such as ECS, utilize friction estimates in a limited way, or use heuristic representation of a friction-like parameter that is tuned to improve controller performance. Even further, some vehicle control system may attempt to estimate tire-road coefficient of friction, but have limited accuracy and efficiency. Inaccuracy and slower estimation responses can significantly impact safety operations, as the tire-road coefficient of friction is a time-varying characters that can experience considerable deviations in a short time span, particularly for vehicles driving at high speeds. Moreover, the importance of friction estimation is heightened by the fact that there is currently no know mechanisms for directly measuring the tire-road coefficient of friction in the technology. Accordingly, having a system that derives better friction estimations, having improved accuracy and efficiency, can be a key consideration in optimizing vehicle safety and stability capabilities. The disclosed friction estimator can calculate a friction estimation at improved accuracy, which is then used by the vehicle control system in keeping the vehicle operating within a safe region, for example when driving on terrain that impacts friction (e.g., asphalt, gravel, snow, etc.). Particularly, the disclosed system applies the distinct approach of integrating the friction estimation scheme with the envelope control, which derives a better friction estimate and in a time prior to reaching the safety limits of the vehicle (e.g., allowing adjustments before reaching the point of losing control of the vehicle). Also, the disclosed friction estimation techniques use multiple bins, as described in greater detail below, for improved efficiency and to integration of the dynamic envelopes into the estimation calculations.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for vehicle control can be implemented in other types of vehicle including gasoline- or diesel-powered vehicles, fuel-cell vehicles, electric vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MS}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
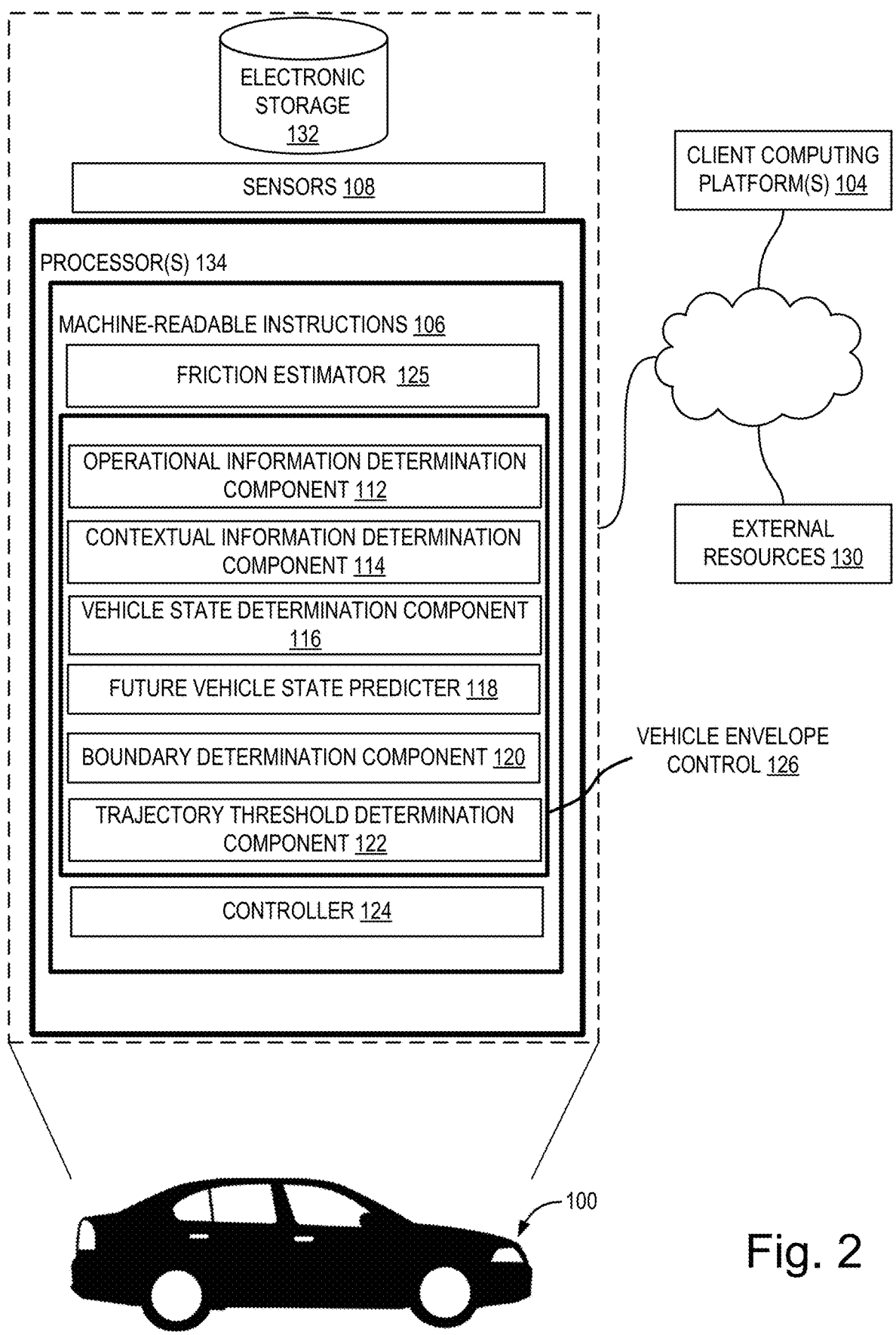
FIG. 2 illustrates an example vehicle configured for partially controlling operation of a vehicle based on operational constraints of the vehicle, including friction estimation, in accordance with one or more implementations.

FIG. 2 illustrates a vehicle 100 (e.g., vehicle 2) configured for partially controlling operation of a vehicle based on operational constraints of the vehicle, including an estimation of the tire-road coefficient of friction (i.e., μ), in accordance with one or more implementations. In some implementations, vehicle 100 may include sensors 108, electronic storage 132, processor(s) 134, and/or other components. Vehicle 100 may be configured to communicate with one or more client computing platforms 104 according to a client/server architecture and/or other architectures. In some implementations, users may access vehicle 100 via client computing platform(s) 104.

Sensors 108 may be configured to generate output signals conveying operational information regarding the vehicle. The operational information may include values of operational parameters of the vehicle. The operational parameters of vehicle 100 may include yaw rate, sideslip velocities, slip angles, percent slip, frictional forces, degree of steer, heading, trajectory, front slip angle corresponding to full tire saturation, rear slip angle corresponding to full tire saturation, maximum stable steering angle given speed/friction, gravitational constant, coefficient of friction between vehicle 100 tires and roadway, distance from center of gravity of vehicle 100 to front axle, distance from center of gravity of vehicle 100 to rear axle, total mass of vehicle 100, total longitudinal force, rear longitudinal force, front longitudinal force, total lateral force, rear lateral force, front lateral force, longitudinal speed, lateral speed, longitudinal acceleration, brake engagement, steering wheel position, time derivatives of steering wheel position, throttle, time derivatives of throttle, gear, exhaust, revolutions per minutes, mileage, emissions, and/or other operational parameters of vehicle 100. In some implementations, at least one of sensors 108 may be a vehicle system sensor included in an engine control module (ECM) system or an electronic control module (ECM) system of vehicle 100. In some implementations, at least one of sensors 108 may be vehicle system sensors separate from, whether or not in communication with, and ECM system of the vehicle. Combinations and derivations of information (or of parameters reflecting the information) are envisioned within the scope of this disclosure. For example, in some implementations, the current operational information may include yaw rate and/or its derivative for a particular user within vehicle 100.

In some implementations, sensors 108 may include, for example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, a proximity sensor, global positioning system (or other positional) sensor, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensor (including a blood pressure sensor, pulse oximeter, heart rate sensor, driver alertness sensor, ECG sensor, etc.), degree-of-freedom sensor (e.g. 6-DOF and/or 9-DOF sensors), a compass, and/or other sensors. As used herein, the term "sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of vehicle 100. In some implementations, sensors may also include sensors within nearby vehicles (e.g. communicating with the subject vehicle via V to V or other communication interface) and or infrastructure sensors (e.g. communicating with the subject vehicle via the 2 I or other communication interface).

Sensors 108 may be configured to generate output signals conveying contextual information. The contextual information may characterize a contextual environment surrounding the vehicle. The contextual environment may be defined by parameter values for one or more contextual parameters. The contextual parameters may include one or more characteristics of a fixed or moving obstacle (e.g., size, relative position, motion, object class (e.g., car, bike, pedestrian, etc.), etc.), number of lanes on the roadway, direction of traffic in adjacent lanes, relevant traffic signs and signals, one or more characteristics of the vehicle (e.g., size, relative position, motion, object class (e.g., car, bike, pedestrian, etc.), etc.), direction of travel of the vehicle, lane position of the vehicle on the roadway, time of day, ambient conditions, topography of the roadway, obstacles in the roadway, and/or others. The roadway may include a city road, urban road, highway, onramp, and/or offramp. The roadway may also include surface type such as blacktop, concrete, dirt, gravel, mud, etc., or surface conditions such as wet, icy, slick, dry, etc. Lane position of a vehicle on a roadway, by way of example, may be that the vehicle is in the far left lane of a four lane highway, or that the vehicle is straddling two lanes. The topography may include changes in elevation and/or grade of the roadway. Obstacles may include one or more of other vehicles, pedestrians, bicyclists, motorcyclists, a tire shred from a previous vehicle accident, and/or other obstacles that a vehicle may need to avoid. Traffic conditions may include slowed speed of a roadway, increased speed of a roadway, decrease in number of lanes of a roadway, increase in number of lanes of a roadway, increase volume of vehicles on a roadway, and/or others. Ambient conditions may include external temperature, rain, hail, snow, fog, and/or other naturally occurring conditions.

In some implementations, sensors 108 may include virtual sensors, imaging sensors, depth sensors, cameras, and/or other sensors. As used herein, the term "camera", "sensor" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, timestamped, annotated, and/or otherwise processed such that information captured by other sensors can be synchronized, aligned, annotated, and/or otherwise associated therewith. For example, contextual information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage, e.g., electronic storage 132, such that captured information may be stored, at least initially, in the integrated embedded storage of a particular vehicle, e.g., vehicle 100. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

Vehicle 100 may be configured by machine-readable instructions 106. Machine-readable instructions 106 may include one or more instruction components. The instruction components may include computer program components. The instruction components may include one or more of operational information determination component 112, contextual information determination component 114, a vehicle state determination component 116, a future vehicle state predictor 118, a boundary determination component 120, a trajectory threshold determination component 122, a controller 124, and/or other instruction components.

As a general description, the illustrated components within the machine-readable instructions 106 include friction estimator 125 and vehicle envelope control 126. As previously described, there is a feedback between the friction estimation and the vehicle envelope control. In other words, the fiction estimator 125 and the envelope control 126 cooperatively provides information to the other, which in turns serves as input that impacts the continues operation of each component. The Vehicle Envelope Control 126 can operate to ensure vehicle stability can be ensured by limiting the vehicle's motion states to a safe portion of the state space. For planar stabilization alone, measurements of speed, yaw rate, sideslip angle, and tire-road friction capacity are necessary to define a safe bounding envelope for vehicle stability and control in all operating regimes. Thus, the results of the friction estimator 125, which is the friction estimation (e.g., estimated value for the tire-road friction of the vehicle's operation), is used by the vehicle envelope control 126. The envelope control 126 can complement open loop dynamics in a manner that leads to a softer landing on the boundary and better driver feel. Additionally, it allows the vehicle to perform at its natural limits. The vehicle envelope control 126 can derive a yaw acceleration nullcline, given a the maximum stable steering angle for a given speed and friction, which results in a boundary that follows the system dynamics in the yaw direction. The sideslip limits can be defined by the maximum rear slip angle, in order to avoid rear tire saturation. By choosing the nullcline as the boundary, the yaw rate is allowed to grow to its maximum (with natural overshoot).

Referring now to the friction estimator 125, this component estimates friction by comparing actual (or predicted) operational behavior of the vehicle with the bounding envelope. Thus, the friction estimator 125 uses information from the vehicle envelope control 126, namely the bounding envelope, to perform its calculations. In some implementation, the friction estimator 125 can utilize a least squares algorithm for the above mentioned comparison. Vehicle operation behavior near the edges of the bounding envelope can be continuously evaluated, to readjust the friction estimates of the friction estimator 125. In turn, these adjusted friction estimates produced by the friction estimator 125 (assumed to be better estimates for the actual value of μ), can then be fed into the vehicle envelope control 126 to reshape the bounding envelope. For example, if the actual vehicle states are not behaving around the edges of the bounding envelope in a way that is expected, the current friction estimate that is predicted by the friction estimator 125 is determined to be off (e.g., large deviation from the actual value of μ). In other words, when the friction estimation is off, boundaries within the bounding envelope may be hit too early, or too late. In some implementations, if a friction violation occurs too often (e.g., the boundary of the bounding envelope is violated often) the friction estimator 125 may determine that there is a mismatch between friction estimation and the actual value of friction. Then, after identifying the mismatch, the friction estimator 125 can correct the estimation. The friction estimator 125 can be configured to correction the fiction estimation by reallocating bins to approximate the actual friction range. Controllers assigned to each bin can then provide feedback to the friction estimator 125, for adjusting the estimation or re-estimating the friction.

The various components included in the vehicle envelope control 126, as shown in the example of FIG. 2, are now describe in detailed. Operational information determination component 112 may be configured to determine the operational information. The operational information may be based on the output signals. Determination may include identifying the yaw rate, sideslip, slip angle, heading, and/or other operational information of vehicle 100 such that the values of all or some of the operational parameters are identified; identifying if operational parameter values have normal or abnormal quantities; identifying if operational parameter values have near abnormal quantities, identifying extreme excess or extreme deficiency of operational parameter values.

Contextual information determination component 114 may be configured to determine the contextual information. The contextual information may characterize the surrounding contextual environment of the vehicle. Determination of the contextual information may be based on the output signals. Determination of the contextual information may include identifying obstacles, identifying motion of obstacles, estimating distances between vehicle 100 and other vehicles, identifying lane markings, identifying traffic lane markings, identifying traffic signs and signals, identifying crosswalk indicators, identifying upcoming curvature of the roadway, and/or other determinations. Determination of the contextual information may include identify ambient conditions such as temperature, rain, snow, hail, fog, and/or other ambient conditions that may affect control of vehicle 100.

By way of example, contextual information characterizing the contextual environment of vehicle 100 may include values of contextual parameters including direction of travel is North, roadway is three lanes, no roadway shoulder, guardrails constrain the roadway, vehicle 100 is in middle lane, there is secondary vehicle ahead of vehicle 100 in the lane to the left at a given distance. Determined predicted threshold values of the trajectory metric may include considering the guardrails of the roadway, the secondary vehicle nearby, and/or the lane boundaries of the roadway.

In some implementations, contextual information determined by contextual information determination component 114 may be stored in electronic storage 132. In some implementations, the contextual information may be store temporarily such as until a drive is over, until the end of the day, until the end of the week, until the end of the month, until the end of the year, or until it is manually cleared.

Vehicle state determination component 116 may be configured to determine a current vehicle state of the vehicle. The determination of the current vehicle state may be based on the operational information and/or the contextual information. The current vehicle state may represent a current set of values of a set of operational parameters of the vehicle. The current vehicle state may be indicative of the vehicle's stability at a point in time. The current vehicle state may represent a current set of values of a set of contextual parameters. The current vehicle state may be indicative of the vehicle's surrounding environment at a point in time.

In some implementations, the current vehicle state determined by vehicle state determination component 116 may be stored in electronic storage 132 and considered a prior vehicle state. In some implementations, the current vehicle state may be stored temporarily such as until a drive is over, until the end of the day, until the end of the week, until the end of the month, until the end of the year, or until it is manually cleared.

Future vehicle state predictor 118 may be configured to determine a future vehicle state of the vehicle. The future vehicle state of the vehicle may be based on the current vehicle state determined. The future vehicle state may include what a driver of the vehicle is likely to do, a position on the roadway likely to be travelled towards, obstacles on the roadway and their movements, prior vehicle states determined, and/or others. Determination may occur at different levels of granularity. Determination may occur at varying time horizons. In some implementations, more than one future vehicle state may be determined at varying time horizons.

Boundary determination component 120 may be configured to determine predicted boundaries of the operational information. Determination may be based on the operational information. A breach of the predicted boundaries may indicate undesirable values of the operational parameters of the vehicle such that the values are nearing the operational constraints of the vehicle. A breach of the predicted boundaries may include exceeding one or more values of the operational parameters or calculated values based on values of the operational parameters. Nearing and/or exceeding the operational constraints of the vehicle may cause the vehicle and/or a driver of the vehicle to lose vehicle stability, lose vehicle control, cause a collision, and/or other vehicle catastrophes.

Trajectory threshold determination component 122 may be configured to determine predicted threshold values of a trajectory metric. Determination may be based on the contextual information and the operational information. The trajectory metric may characterize a trajectory of the vehicle such that the vehicle is traveling on a roadway. The predicted threshold values of the trajectory metric may represent desirable circumventions in order to avoid causing vehicle catastrophes. Vehicle catastrophes may include a collision, losing control of the vehicle, losing vehicle stability, veering into other lanes, and/or other vehicle catastrophes. By way of non-limiting example, the predicted thresholds of the trajectory metric account for obstacles in the roadway, lane boundaries, roadway boundaries, vehicle width, and/or other predicted thresholds of the trajectory metric. Roadway boundaries may include guardrails, center medians, specific lane markings, parked vehicles, pedestrians, curbs, sidewalks, opposing direction of travel, concrete barriers, barriers of other materials, traffic cones, and/or other roadway boundaries. Vehicle width may be accounted for when determining the predicted threshold values such that obstacles and/or boundaries may be laterally closer in proximity to a wider vehicle.

Controller 124 may be configured to control the vehicle such that the vehicle may circumvent vehicle catastrophes. Controlling the vehicle may be based on the future vehicle state determined, the predicted boundaries of the operational information, and the predicted trajectory threshold values. Controller 124 may be configured to control the vehicle partially. Implementations where controller 124 controls the vehicle partially includes effectuating a determined corrective response in coordination with the driver's operational input such that the driver maintains a majority of the control of the vehicle and controller 124 guides some operational aspects of the vehicle. The corrective response may include modifying some values of the operational parameters and it may be determined by controller 124.

By way of non-limiting example, vehicle 100 may be operated by a driver transporting to a destination. Controller 124 may utilize the future vehicle state determined, the predicted boundaries of the operational information, and the predicted trajectory threshold values to correct the driver's driving decisions and decrease vehicle speed and degree of steer upon determination that, for example, vehicle 100 was traveling too fast on a round onramp to a highway such that vehicle 100 may rollover.

In some implementations, vehicle 100, client computing platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which vehicle 100, client computing platform(s) 104, and/or external resources 130 may be operatively linked via some other communication media.

A given client computing platform 104 may include one or more processors configured to execute computer program components. The computer program components may be configured to enable an expert or user associated with the given client computing platform 104 to interface with vehicle 100 and/or external resources 130, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 130 may include sources of information outside of vehicle 100, external entities participating with vehicle 100, and/or other resources. In some implementations, some or all of the functionality attributed herein to external resources 130 may be provided by resources included in vehicle 100.

Vehicle 100 may include electronic storage 132, one or more processors 134, and/or other components. Vehicle 100 may include communication lines, or ports to enable the exchange of information with a network and/or other computing platforms. Illustration of vehicle 100 in FIG. 1 is not intended to be limiting. Vehicle 100 may include a plurality of hardware, software, and/or firmware components operating together to provide the functionality attributed herein to vehicle 100. For example, vehicle 100 may be implemented by a cloud of computing platforms operating together as vehicle 100.

Electronic storage 132 may comprise non-transitory storage media that electronically stores information. The electronic storage media of electronic storage 132 may include one or both of system storage that is provided integrally (i.e., substantially non-removable) with vehicle 100 and/or removable storage that is removably connectable to vehicle 100 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from vehicle 100, information received from client computing platform(s) 104, and/or other information that enables vehicle 100 to function as described herein.

Processor(s) 134 may be configured to provide information processing capabilities in vehicle 100. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 2 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s)

134 may be configured to execute components 112, 114, 116, 118, 120, 122, and/or 124, and/or other components. Processor(s) 134 may be configured to execute components 112, 114, 116, 118, 120, 122, and/or 124, and/or other components by software; hardware; firmware; some combination of software, hardware, and/or firmware; and/or other mechanisms for configuring processing capabilities on processor (s) 134. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 112, 114, 116, 118, 120, 122, and/or 124 are illustrated in FIG. 1 as being implemented within a single processing unit, in implementations in which processor(s) 134 includes multiple processing units, one or more of components 112, 114, 116, 118, 120, 122, and/or 124 may be implemented remotely from the other components. The description of the functionality provided by the different components 112, 114, 116, 118, 120, 122, and/or 124 described below is for illustrative purposes, and is not intended to be limiting, as any of components 112, 114, 116, 118, 120, 122, and/or 124 may provide more or less functionality than is described. For example, one or more of components 112, 114, 116, 118, 120, 122, and/or 124 may be eliminated, and some or all of its functionality may be provided by other ones of components 112, 114, 116, 118, 120, 122, and/or 124. As another example, processor(s) 134 may be configured to execute one or more additional components that may perform some or all of the functionality attributed below to one of components 112, 114, 116, 118, 120, 122, and/or 124.

Figure 3:
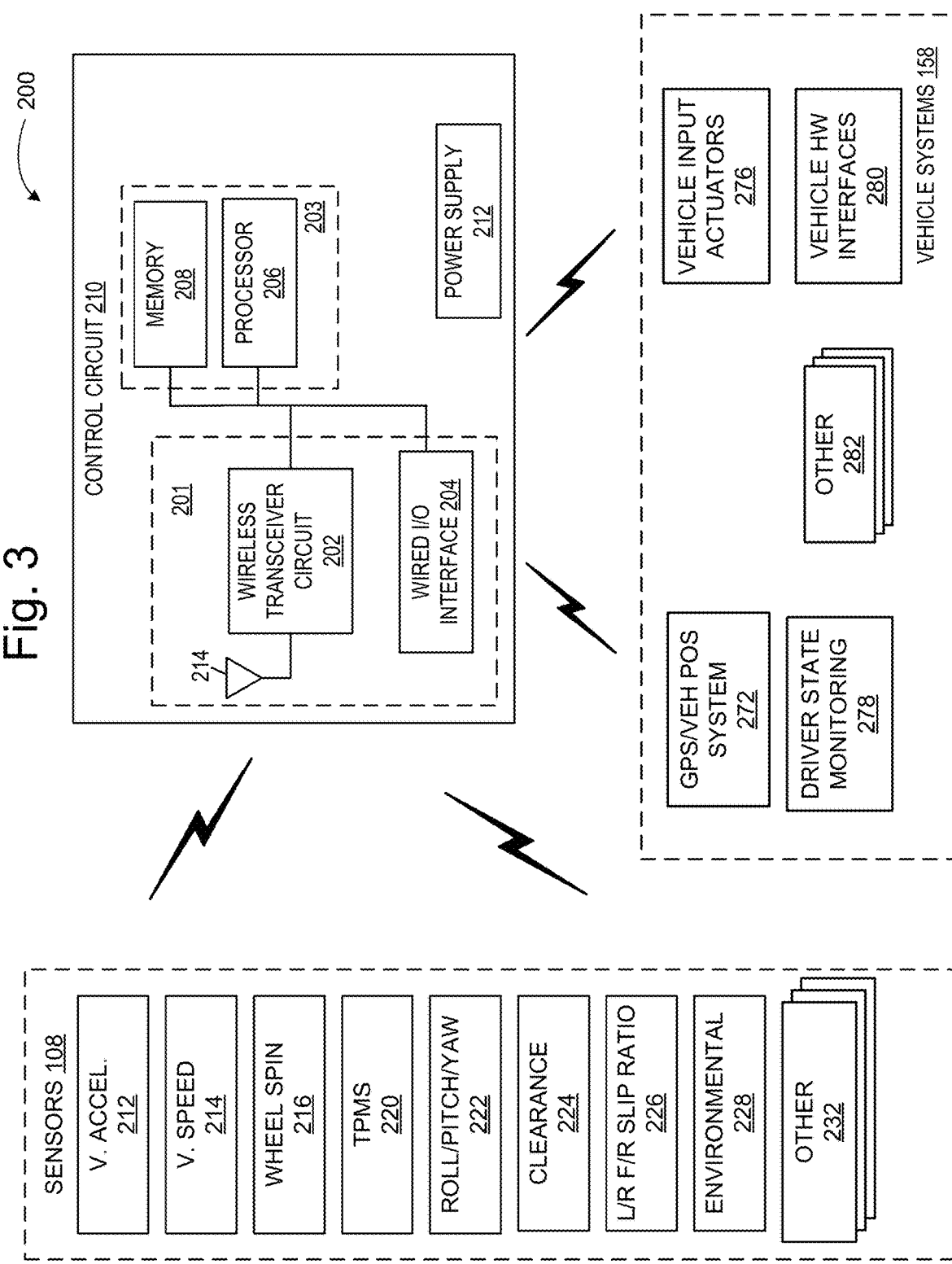
FIG. 3 illustrates an example architecture for predicting envelope violation and implementing a control mode in accordance with one embodiment of the systems and methods described herein.

FIG. 3 illustrates an example architecture for predicting envelope violation, friction estimation, and implementing a control mode in accordance with one embodiment of the systems and methods described herein. Referring now to FIG. 3, in this example, control mode system 200 includes a vehicle control circuit 210, a plurality of sensors 108 and a plurality of vehicle systems 158. Sensors 108 and vehicle systems 158 can communicate with vehicle control circuit 210 via a wired or wireless communication interface. Although sensors 108 and vehicle systems 158 are depicted as communicating with vehicle control circuit 210, they can also communicate with each other as well as with other vehicle systems. Vehicle control circuit 210 can be implemented as an ECU or as part of an ECU such as, for example electronic control unit 50. In other embodiments, vehicle control circuit 210 can be implemented independently of the ECU.

Vehicle control circuit 210 in this example includes a communication circuit 201, a decision circuit 203 (including a processor 206 and memory 208 in this example) and a power supply 212. Components of vehicle control circuit 210 are illustrated as communicating with each other via a data bus, although other communication in interfaces can be included.

Processor 206 (e.g., processor 134) can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory, and may be configured to store data and other information as well as operational instructions that may be used by the processor 206 to vehicle control circuit 210.

Although the example of FIG. 3 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a vehicle control circuit 210.

Communication circuit 201 either or both a wireless transceiver circuit 202 with an associated antenna 214 and a wired I/O interface 204 with an associated hardwired data port (not illustrated). As this example illustrates, communications with control circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by vehicle control circuit 210 to/from other entities such as sensors 108 and vehicle systems 158.

Wired I/O interface 204 can include a transmitter and a receiver (not shown) for hardwired communications with other devices. For example, wired I/O interface 204 can provide a hardwired interface to other components, including sensors 108 and vehicle systems 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and $NiH_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 108 can include, for example, one or more of sensors 52 such as those described above with reference to the example of FIG. 1 and sensors 108 described above with reference to FIG. 2. Sensors 108 can include sensors that may or not otherwise be included on a standard vehicle 10 with which embodiments of the present disclosure are implemented. In the example illustrated in FIG. 3, sensors 108 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect weather, traction conditions, or other environmental conditions). Additional sensors 232 can also be included as may be appropriate for a given implementation of assist-mode system 200.

Vehicle systems 158 can include any of a number of different vehicle components or subsystems used to control or monitor various aspects of the vehicle and its performance. In this example, the vehicle systems 158 include a GPS or other vehicle positioning system 272; driver-state monitoring system 278 to monitor a condition of the driver; vehicle input actuators 276 vehicle hardware interface 282 provide inputs to vehicle systems for vehicle control; and other vehicle systems 282.

During operation, vehicle control circuit 210 can receive information from various vehicle sensors to determine whether the control mode should be activated. Communication circuit 201 can be used to transmit and receive information between vehicle control circuit 210 and sensors 108, and vehicle control circuit 210 and vehicle systems 158. Also, sensors 108 may communicate with vehicle systems 158 directly or indirectly (e.g., via communication circuit 201 or otherwise).

In various embodiments, communication circuit 201 can be configured to receive data and other information from sensors 108 that is used in determining whether and to what extent control mode blending should be activated. Additionally, communication circuit 201 can be used to send an activation signal or other activation information to various vehicle systems 158 as part of entering the control mode. For example, as described in more detail below, communication circuit 201 can be used to send signals to one or more of the vehicle input actuators 276 to control things such as, for example, maximum steering angle, throttle response, vehicle braking, torque vectoring, and so on.

Figure 4:
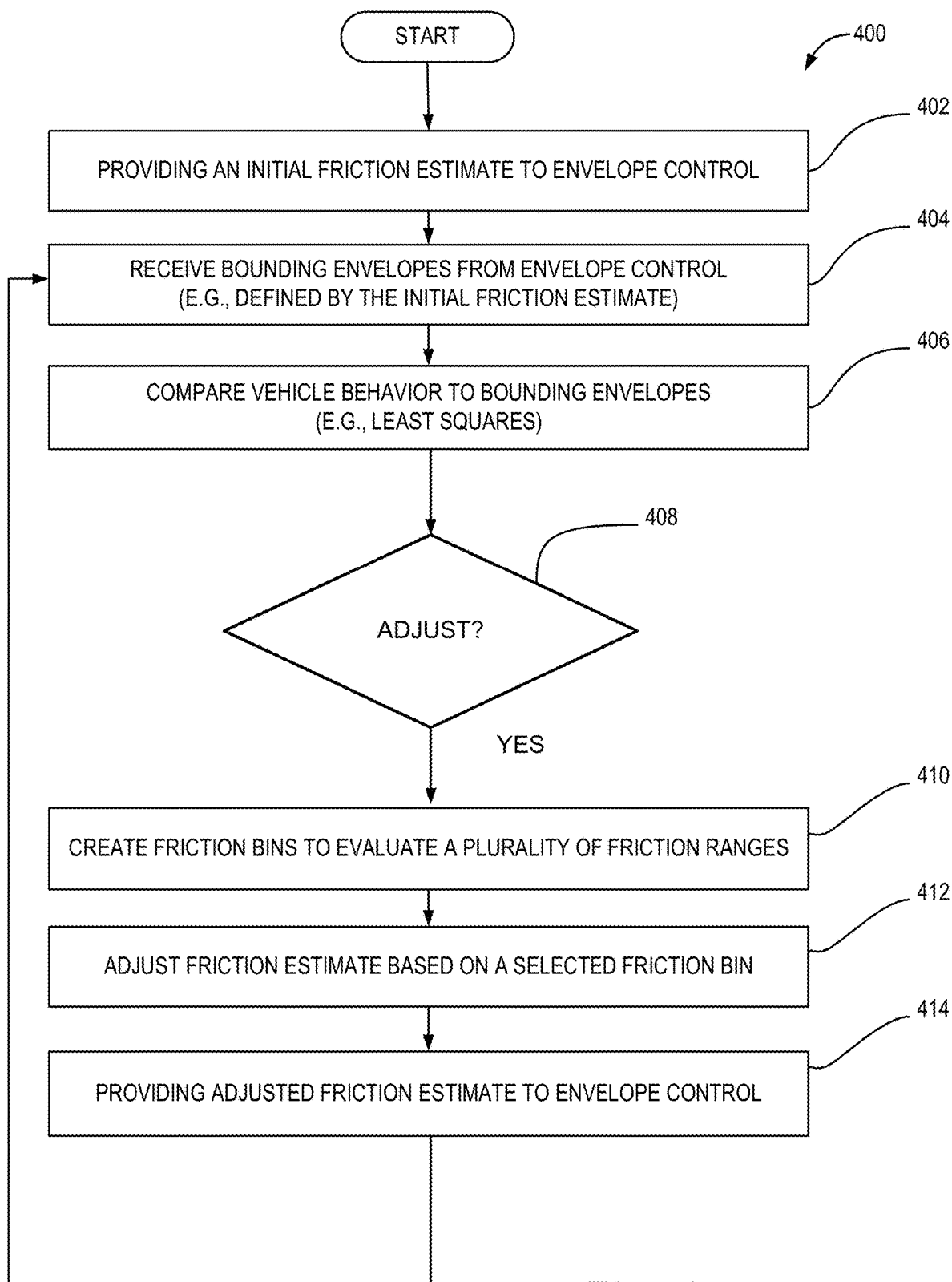
FIG. 4 illustrates an example process for friction estimation using bins and dynamic envelopes, in accordance with one or more implementations.

FIG. 4 illustrates an example process for performing the disclosed friction estimation techniques, as particularly used for partially controlling operation of a vehicle based on operational constraints for vehicle safety and stabilization, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

As alluded to above, there are difficulties associated with determining a true value for an actual tire-road coefficient of friction to (i.e., $\mu$), reflecting the actual friction that may be currently experienced by tires of the vehicle (e.g., contacting a particular surface during driving). Due to these difficulties regarding an actual friction value, a friction estimate, which is an estimated value for $\mu$, is calculated by the disclosed techniques to be applied as an aspect of vehicle control functionality (e.g., maneuvering for stability and safety of the vehicle). The process 400 can begin with an operation 402, which involves communicating an initial friction estimate to the envelope control. In some implementations, the initial frictional estimate can be a determined value corresponding to driving conditions, such as the type of surface (e.g., road surface that current in contact with the vehicle's tires). For example, a vehicle sensor can detect that it is currently being driven over concrete. In this case, operation 402 can set the initial friction estimate to a stored value that particularly correspond to a concrete surface where $\mu=1$. As another example, the vehicle's sensors detecting a gravel surface can cause the initial friction estimate to be set to a different value, where $\mu=0.5$. Other operational information, including other values of operational parameters of the vehicle can be used to determine the initial friction estimate, in some cases. In an implementation, the initial friction estimate can be a static value that is used for process 400 that is deemed appropriate (e.g., based on experimentation, or design). Accordingly, generally, process 400 can adjust this static value (or the selected value) in order to calculate an improved estimate that may be closer to an actual friction than the initial friction estimation.

Then, after a value is selected for the initial friction estimate, operation 402 communicates this initial friction estimate to the envelope control. As described above, a key feature of the disclosed embodiments is the cooperative integration of the friction estimation and the dynamic envelopes. In other words, the vehicle stability envelopes that a controller should maintain are defined and shaped by the friction estimate. As such, the equations used for implementing dynamic envelopes are defined by the friction estimation. In order to apply a value for friction while developing the vehicle envelopes, such as the stability envelope, the friction estimate is passed to the vehicle envelope control in operation 402. Operation 402 may be performed by one or more hardware processors configured by machine-readable instructions including a component that is the same as or similar to friction estimator 125 (shown in FIG. 2), and transferring data to the vehicle envelope control 126 (shown in FIG. 2) in accordance with one or more implementations.

An operation 404 may include receiving bounding envelopes from the vehicle envelope control that are particularly determined using the initial friction estimate from previous operation 402. Thus, the process 400 can consider bounding envelopes of the vehicle stability and control while further estimating the friction. This can be considered as another side of the cooperation, where the friction estimation techniques need the dynamic envelopes. That is, friction estimation not only a parameter that used by envelope control, but estimation is refined by including the envelope control.

Thereafter, an operation 406 may include comparing an actual (or predicted) vehicle behavior with the boundaries of the bounding envelopes received in previous operation 404. That is, the current vehicle states can be compared to the bounding envelopes determined by the friction estimate. In some implementations, this comparison can be performed using a known comparative algorithm, for example a least squares algorithm, or machine learning techniques. Vehicle behavior that is near the edges of the bounding envelope can be continuously evaluated, for example using this comparison in operation 406 to determine whether the friction estimation should be adjusted, or otherwise re-estimated. Generally, when the dynamics meet either condition: 1) never reach the bounds, even with sufficient excitation or approach the bounds at an unexpected angle in the phase plane; or 2) always exits the bounds, it can indicate a problem with the friction estimate (assuming other measured quantities, such as yaw rate and speed are accurately measured).

Subsequently, in operation 408, a determination whether a readjustment for the friction estimate should be performed, based on the comparison is previous operation 404. For instance, in a case where the actual vehicle states are not behaving around the edges of the bounding envelope as expected, then this mismatch can indicate that the friction estimate has a substantial deviation from actual friction and should be readjusted for a better estimation.

Alternatively, if the actual vehicle behavior is determined to match the bounding envelopes, then the friction estimation is considered to be substantially close to the actual value of friction. In some implementations, when a match is determined in operation 406, the controller can use the initial friction estimate for its dynamic envelopes and vehicle control functions, and process 400 does not need to continue to perform the estimation adjustment operations. However, in some implementations, the friction estimation techniques can continue to adjust and refine the estimation based on observation over time, even if the friction estimation is deemed appropriately accurate (e.g., with respect to the current operation conditions). An example of the continue estimation technique is described below in reference FIG. 5.

Referring back to the scenario when operation 408 determines that the friction estimate should be adjusted, the process 400 can continue to operation 410. Operation 410 may include creating friction bins to test a range of friction estimates. During operation 410, the friction estimator can divide an expected friction range of the vehicle into a plurality of different ranges in which the controller is robust under, where each range is assigned to a friction bin. The friction bins can be divided evenly within the operating range of friction. In some cases, a controller is allocation for each friction bin that is created. The friction bins can be calculated through reachability analysis of each controller, for instance to determine how effective a control algorithm is over a range of certainty and how wide of a friction range which high confidence levels should be allotted for each friction bin. In another implementation, the friction bins can be created to be divided to different friction ranges based on environmental conditions (e.g., weather). In an example, if the vehicle sensors detect rain or snow, more friction bins may be allocated to lower friction ranges to account for the condition's impact on a road's surface (and ultimately tire-road friction and vehicle stability). Conversely, on a sunny day (e.g., vehicle does not detect rain, snow, etc.), more friction bins can be allocated to higher friction ranges.

As an example, a vehicle controller may be robust to certain range of friction, where $\mu=0.08$ to $\mu=1$. In this example, operation 410 can divide the expected friction range into a plurality of different friction ranges by creating 5 different friction bins that the controller is robust under. For instance, the friction bins created can include: [0, 0.2], [0.2, 0.4], [0.4, 0.6], [0.6, 0.8], [0.8, 1.0]. As a result, the dynamics corresponding to friction estimates in each bin can be evaluated. Referring again to the example, a dynamic response can be measured for each of the five friction bins that were created. In detail, a dynamic response corresponding to operation within bin 1 with friction estimates [0, 0.2] can be measured. Another dynamic response corresponding to operation within bin 2 with friction estimates [0.2, 0.4] can be measured. Then, another dynamic response corresponding to operation within bin 3 with friction estimates [0.4, 0.6] can be measured, and so on for each friction bin. From measuring dynamics that result from each friction bin, a friction bin that most closely bounds the vehicle state response can be selected (from the five created friction bins). For instance, if a state corresponding to a friction bin 2 always exits the envelope, the friction estimate associated that bin is probably too low and one of the higher bins (e.g., including larger friction estimation values), such as bins 3-5, is probably a better match for the bounds including friction ranges that may be closer to the actual friction. This serves to illustrate the relationship that exists between envelope definition, and the ability to estimate the friction parameter. As alluded to above, this tight relationship is due to the notion that the stability envelope is defined by the friction estimate or friction bin (e.g., bin average or max).

Next, an operation 412 can include adjusting the friction estimate based on the selected friction bin. Again, referring the to the example, bin 3 may be selected as the bin that most closely bounds the vehicle state response. Accordingly, the friction range corresponding to bin 3 [0.4, 0.6], may be used to adjust the friction estimate from a previous value, such as the initial friction estimate. In turn, this adjusted friction estimate is fed back to the envelope control, and is used to reshape the bounding envelope (that was previously shaped using the old friction estimate). Process 400 proceeds to operation 414 where the adjusted friction estimate is communicated to the envelope control, so that vehicle envelopes, such as stability envelopes, can be defined by the adjusted friction estimate (e.g., applying the adjusted friction estimate to envelope equations). As illustrated in FIG. 4, operations 404-414 of the process can be implemented as iterative steps, where the friction estimate is continuously adjusted and the envelopes reshaped in later iterations. In some implementations, iterations continue as long as envelopes are used for vehicle control. Alternatively, iterations may conclude when a friction estimate is deemed as accurate, or deemed substantially close to actual friction as appropriate.

Figure 5:
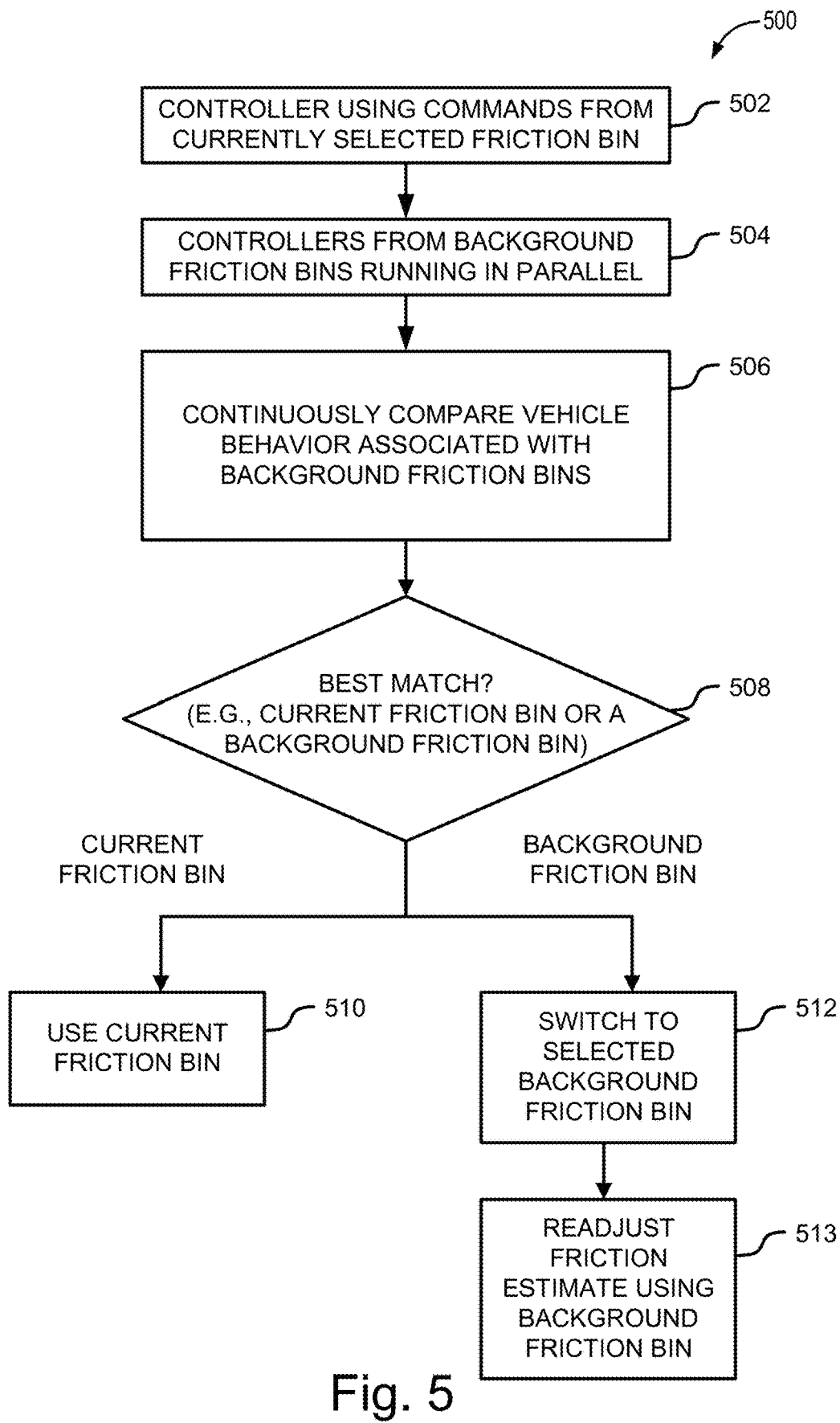
FIG. 5 illustrates another example process for friction estimation using bins, multiple processors, and dynamic envelopes, in accordance with one or more implementations.

FIG. 5 illustrates another example process for continually running the friction estimation by using multiple controllers running in parallel, where each controller can be allocated to an individual friction bin. Similar to the abovementioned process (shown in FIG. 4), the process in FIG. 5 can also be used as an aspect in partially controlling operation of a vehicle based on operational constraints of the vehicle, including estimated friction. In some implementations, process 500 may be accomplished with one or more additional operations not described, and/or without one or more of the operations discussed. Additionally, the order in which the operations of this method are illustrated in FIG. 5 and described below is not intended to be limiting.

At operation 502 a controller can send control commands based on vehicle envelopes and the friction estimate corresponding to a currently selected friction bin. For example, operation 502 can occur after process 400 determines an accurate friction estimate based on estimation adjustment techniques. As noted above, multiple friction bins can be created for friction estimation. Although a selected friction bin is used by a controller executing vehicle control functions, in operation 504, controllers that are allocated for the remaining friction bins can continue to run in parallel. For example, operation 504 can involve running the other controllers in the background of the vehicle control functions, where the friction bins corresponding to these controllers are referred to as background friction bins (for purposes of discussion). Referring yet again to the example of five friction bins (as described in reference to FIG. 4), a current friction estimate can be determined, where $\mu=0.9$. Therefore, in operation 502, the controller using bin 5 [0.8, 1.0] can be employed to effectuate vehicle envelopes and vehicle control and stability. However, in operation 504, other controllers can continue to run algorithms using values from each of the other background friction bins, namely bins 1-5. Thus, these controllers can continue to recalculate the expected dynamics from control output, assuming the lower friction within the background friction bins.

To begin the recalculation, operation 506 involves continuously comparing the vehicle behavior with respect to the background friction bins. That is, the resulting vehicle states from each of the bins can be compared to the bounding envelope over time. In some implementations, the comparison in operation 506 is performed using the least squares algorithm. As a result of the ongoing comparison, it may be determined after a time period that dynamics have changed, and now match more closely to those expected from the output of one of the background friction bins, as opposed to the current friction bin. Accordingly, the next operation 508 includes selecting a best match from the among the current and background friction bins, based on the comparison. In other words, the process 500 can consider how the dynamics of the vehicle may change over time in a manner that impacts friction, by continuously evaluating the vehicle's states against the friction bins. By continuing to run the controllers (and their corresponding friction bins), a determination of whether to maintain the friction estimate corresponding to the current friction bin, or to readjust the friction estimate to one of the background friction bins can be made.

In the case where the current friction bin is the best match, the process 500 continues operation 510 and the current friction estimate can be maintained. Alternatively, when a background friction bin is determined to be a best match, the process 500 proceeds to operation 512 and switches to the background friction bin that is selected as the best match in previous operation 508. In the example, operation 508 may indicate that the friction estimate should be readjusted from its current value, where $\mu=0.9$. Thus, in operation 512, the estimation can switch to a friction range corresponding to one of the lower bins, for instance bin 3.

Thereafter, at operation 513, the friction estimation can be readjusted using the selected background bin. Furthermore, the readjusted friction estimate can be fed back to the envelope control to reshape the bounding envelope. In some cases, if friction violations occur often in process 500 (e.g., the boundary of the bounding envelope is violated often) the friction estimation techniques can determine there is a mismatch in friction estimation, and thereby readjusts the friction estimation. Operation 513 can involve correcting the friction estimate to provide a re-estimation of actual friction that may have been subjected to changes, due to encountering new road surfaces or new driving conditions (e.g., rain), for instance. In some cases, operation 513 can involve reallocating bins to approximate the actual friction range. Thus, the controllers assigned to the friction bins can provide feedback to friction estimation, for re-estimating the friction.

Figure 6:
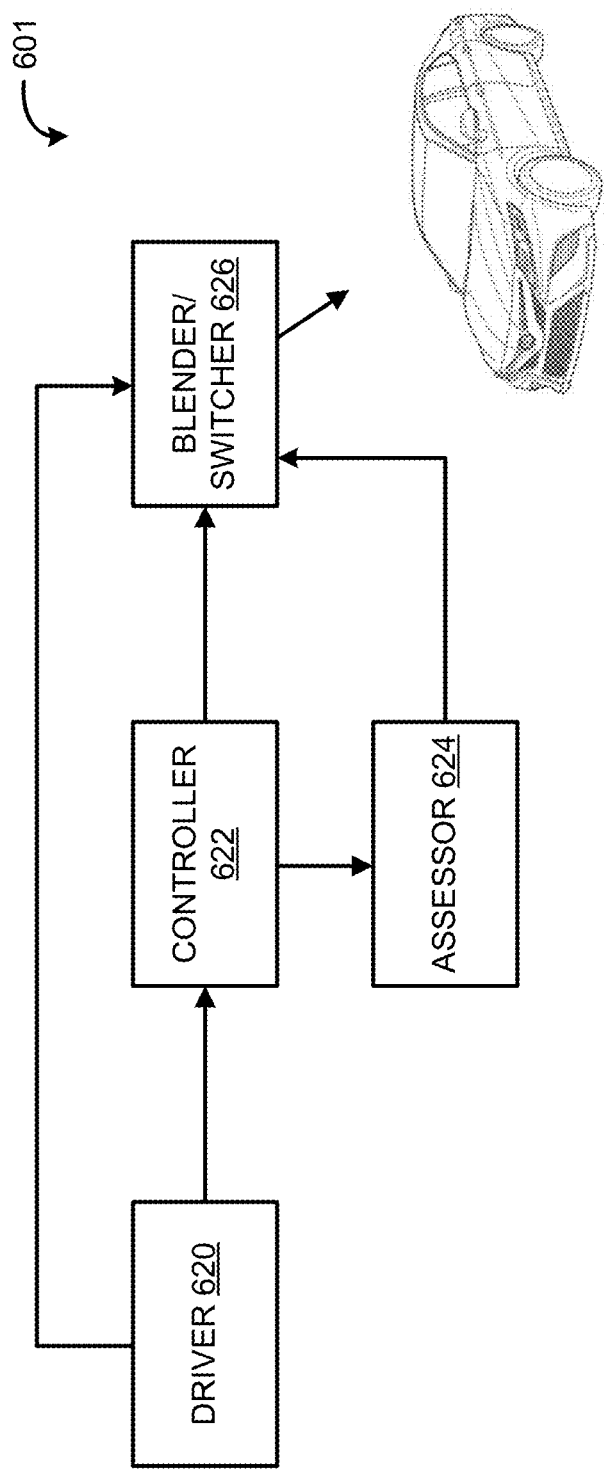
FIG. 6 illustrates example strategies for vehicle control based on friction estimation and dynamic envelopes, in accordance with various implementations.

FIG. 6 illustrates example strategies for vehicle control in accordance with various implementations. The first example strategy 601 relies on a controller 622, such as a processor or other circuit, to provide a solution to use driver input 620 and automated control, in some instances generating blended commands. Driver inputs such as driver commands for operating a vehicle are provided to the controller 622. Controller 622 determines a desired command based on the driver command in the context of operational information regarding the vehicle, including a friction estimation. In some cases, the automation control can be based on the disclosed techniques such as stability envelopes, bounding envelopes, and enhanced friction estimation, employing control commands that ensure the vehicle motion stays within a safe portion of the state space. The desired command may be the same command made by the driver, or it may be a command that is adjusted or altered from the driver input to optimize (whether fully or partially optimized based on circumstances) the command based on the sensed operational information and/or contextual information of the vehicle.

By way of example, if the vehicle operator depresses the accelerator pedal on a slick roadway surface, the controller may adjust that command to optimize it for the slick surface (e.g., to adjust the commanded throttle input to reduce the amount of torque that might be otherwise applied to the driving wheels). Using the same example, the controller may adjust multiple commands to optimize operation of the vehicle for the slick surface. The assessor circuit 624 can determine metrics used to determine whether driver commands are used, optimized commands are used, or a combination thereof are used based on the threat level. Accordingly, the assessor circuit actuates the blender switcher to provide an actuator command to the vehicle that may include controller commands, driver commands, or encompass a range of blending of controller commands and driver commands based on the threat level.

Accordingly, the control envelope may be a discrete on-off switch between the human control and processor-based control. Also, in various implementations, the control envelope can blend of both human control and processor control to achieve optimal performance. An additional implementations, the system can blend this contextual/operational aware processor control with autonomous vehicle operation in a similar fashion to achieve envelope control in autonomous vehicles.

In the various implementations, the optimized commands presented to the vehicle can take into account not only operational and/or contextual information regarding the vehicle, but can also consider the envelope of performance of the vehicle. In other words, the commands can be adjusted so as not to exceed the performance envelope (e.g., the performance constraints) of the vehicle. For example, consider a situation in which a vehicle is entering or about to enter a curve in the roadway. The system may be configured to determine the maximum lateral g-forces the vehicle can handle in existing conditions. Using this information and roadway information (e.g. from map or GPS information) the controller may determine how much speed the vehicle can carry into the corner without exceeding the vehicle envelope. If it appears that the vehicle is going to into the corner at too great a speed, the controller may take action to provide optimal commands to the vehicle such as reducing throttle input (e.g., remapping the throttle in real-time), reducing the amount of steering angle applied by the driver, applying braking before the corner and/or trail braking into the corner, increasing or decreasing the amount of braking as compared to that applied by the driver (e.g., to control vehicle speed or to adjust/even out the loading placed on the vehicle wheels), applying selective braking to one or more wheels to improve the cornering of the vehicle, and so on. In various implementations, the vehicle envelope information may be stored for a given vehicle and retrieved and used to develop optimal commands based on the operational and/or contextual information. In further implementations, the processor(s) may be configured to determine envelope information in real-time or near real-time based on the operational and/or contextual information. For example, the system may determine a real-time cornering envelope for a vehicle entering a corner on a wet roadway, at 75° F. with summer tires having adequate remaining tread wear. This cornering envelope in this example may include, the maximum lateral g-force the vehicle is expected to tolerate in these conditions without experiencing unwanted oversteer, understeer, or other unwanted loss of traction. Margins of safety can be built into the envelope such that the vehicle is operated safely within its outer boundaries.

In various implementations, the system can be trained using machine-learning in conjunction with actual vehicle experiences to determine optimal commands and identify the best options for safely addressing various potentially adverse situations.

In some situations, it may be impossible to track the desired path determined based on driver or planner inputs. Accordingly, embodiments can be implemented to define safe tubes to give flexibility to the controller to redefine the path or to create an optimal path. Such embodiments can be implemented to ensure stability, provide a backup plan if the plant path is not possible or to trade off ride comfort with path definition.

Figure 8:
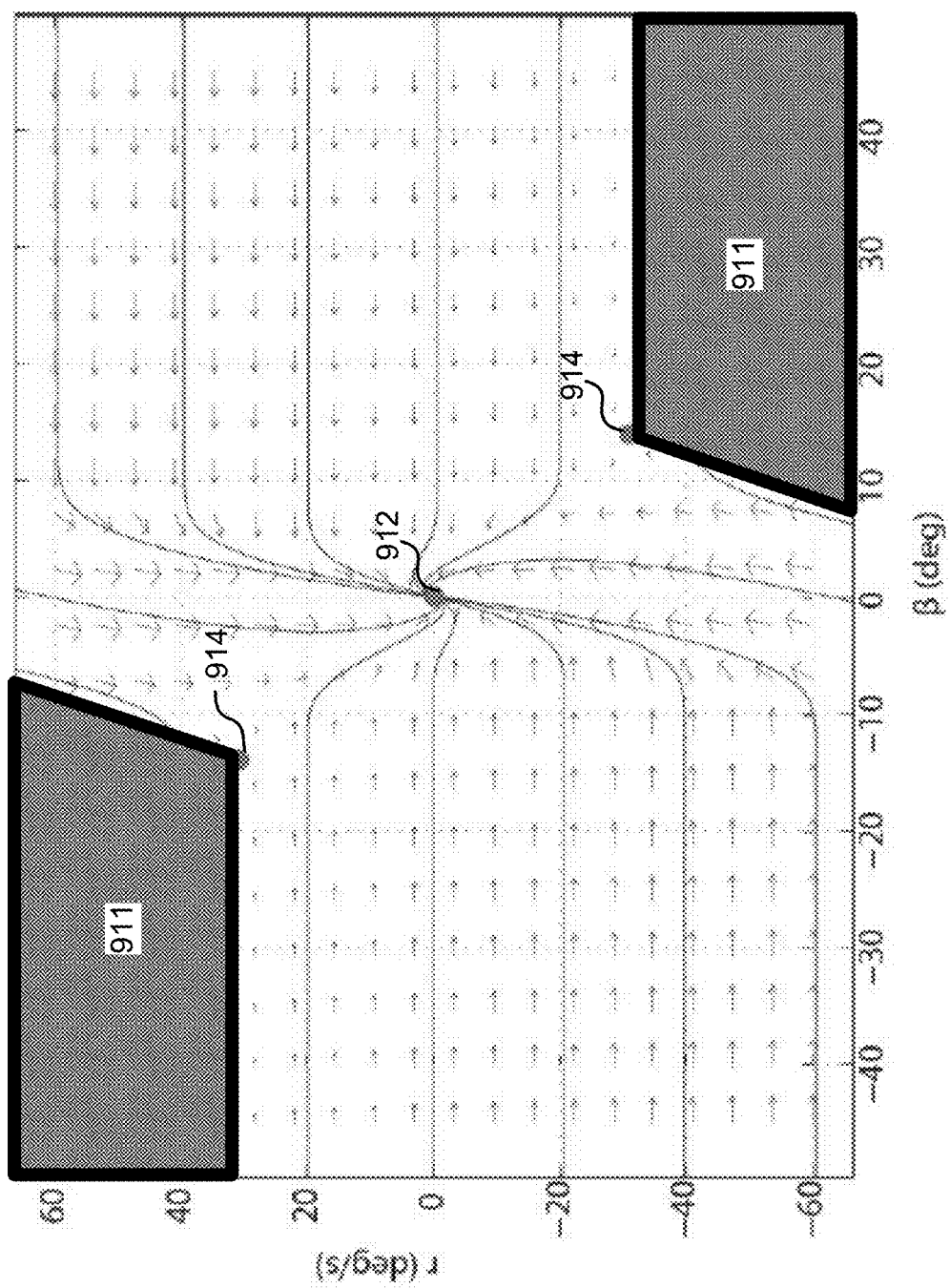
FIG. 8 illustrates an example of reaches of instability in the example illustrated in FIG. 9.

FIG. 8 illustrates an example of defining safe tubes in accordance with one embodiment. With reference now to FIG. 8, the dashed line defines the nominal path as determined by the controller based on user input or planner input. As this example illustrates, obstacles (denoted by black boxes), whether vehicles or other obstacles) are blocking the path of the subject vehicle.

In the middle portion of the diagram 664, the problem is broken up into time segments from k=0 to k=30. Then, as shown at the bottom portion, tube boundaries 675, 676 define boundaries for possible available paths through the obstacles. The system can use this information to calculate an available path to the desired destination and various path options can be chosen based on optimum trajectory. An example of optimizing trajectory can be shown at the right hand side of the bottom segment of the figure where tube boundary 675 only defines the tube to the left-hand side of object 678 and not to the right hand side of object 678. This is a more optimum path trajectory than would be achieved by requiring vehicle to go around object 678 to the right.

Various embodiments disclosed herein utilize envelopes to determine the boundaries of vehicle performance. A safe envelope can be defined both mathematically and graphically. FIGS. 7-14 illustrate an example of the concept of envelope definition in accordance with one embodiment. Because vehicle stability characteristics are well captured by the two-state planar bicycle model with a nonlinear lateral brush tire model, the sideslip-yaw rate (β–r) phase plane provides straight-forward visualization of the vehicle dynamics. The phase plane view allows an engineer to quickly determine a safe operating region for the vehicle and design a control scheme that works hand-in-hand with the open loop dynamics.

Figure 7:
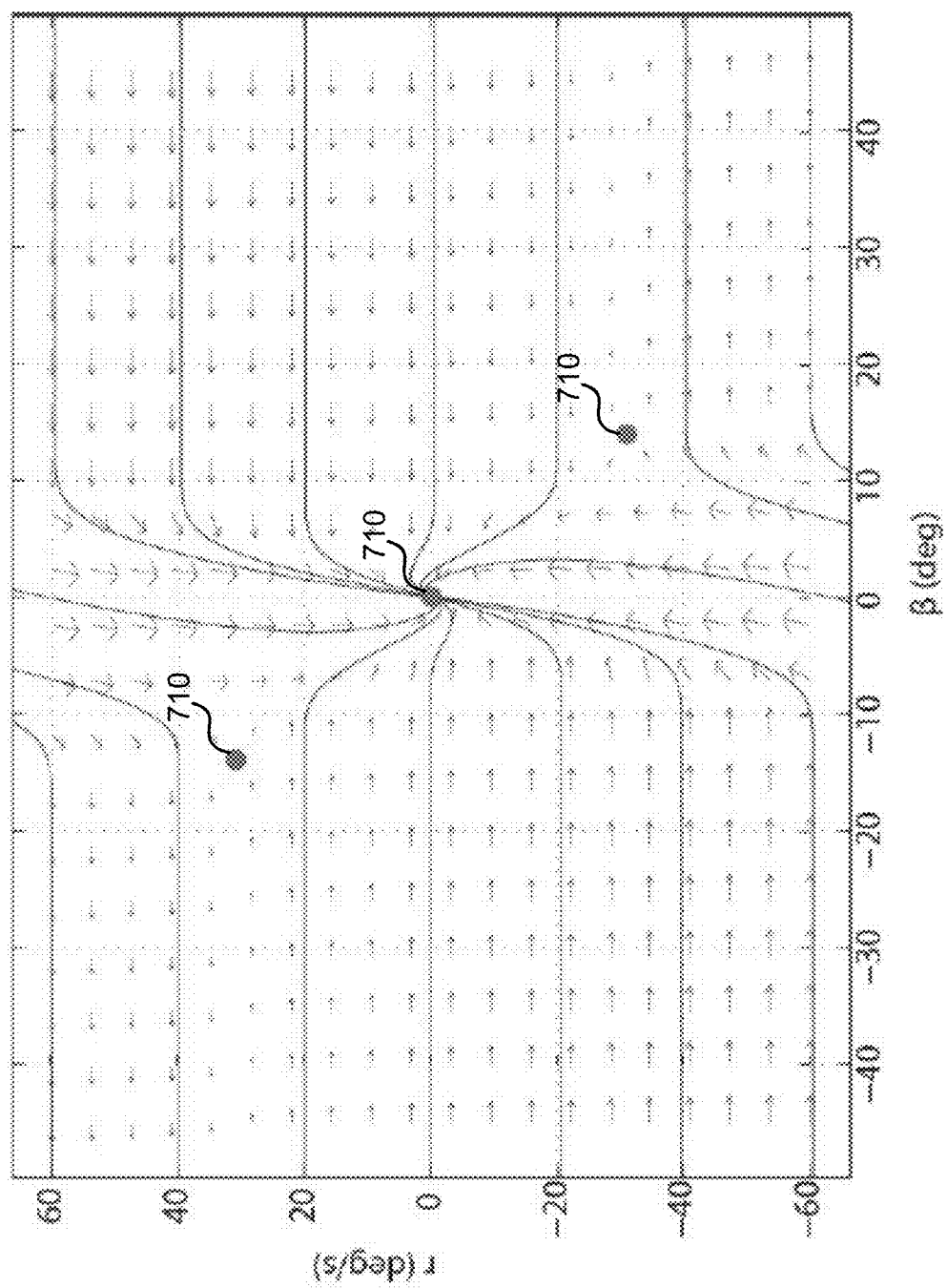
FIG. 7 illustrates an example of a phase portrait showing state trajectories and equilibrium points or a set operating point including steering angle, coefficient of friction and longitudinal speed.

FIG. 7 illustrates a phase portrait showing state trajectories and equilibrium points or a set operating point including steering angle, coefficient of friction and longitudinal speed. Equilibrium points 710 are defined where state derivatives are equal to zero. The portrait can be used to evaluate derivatives of 2 states (e.g., yaw rate, r and sideslip β) across the state space.

Figure 9:
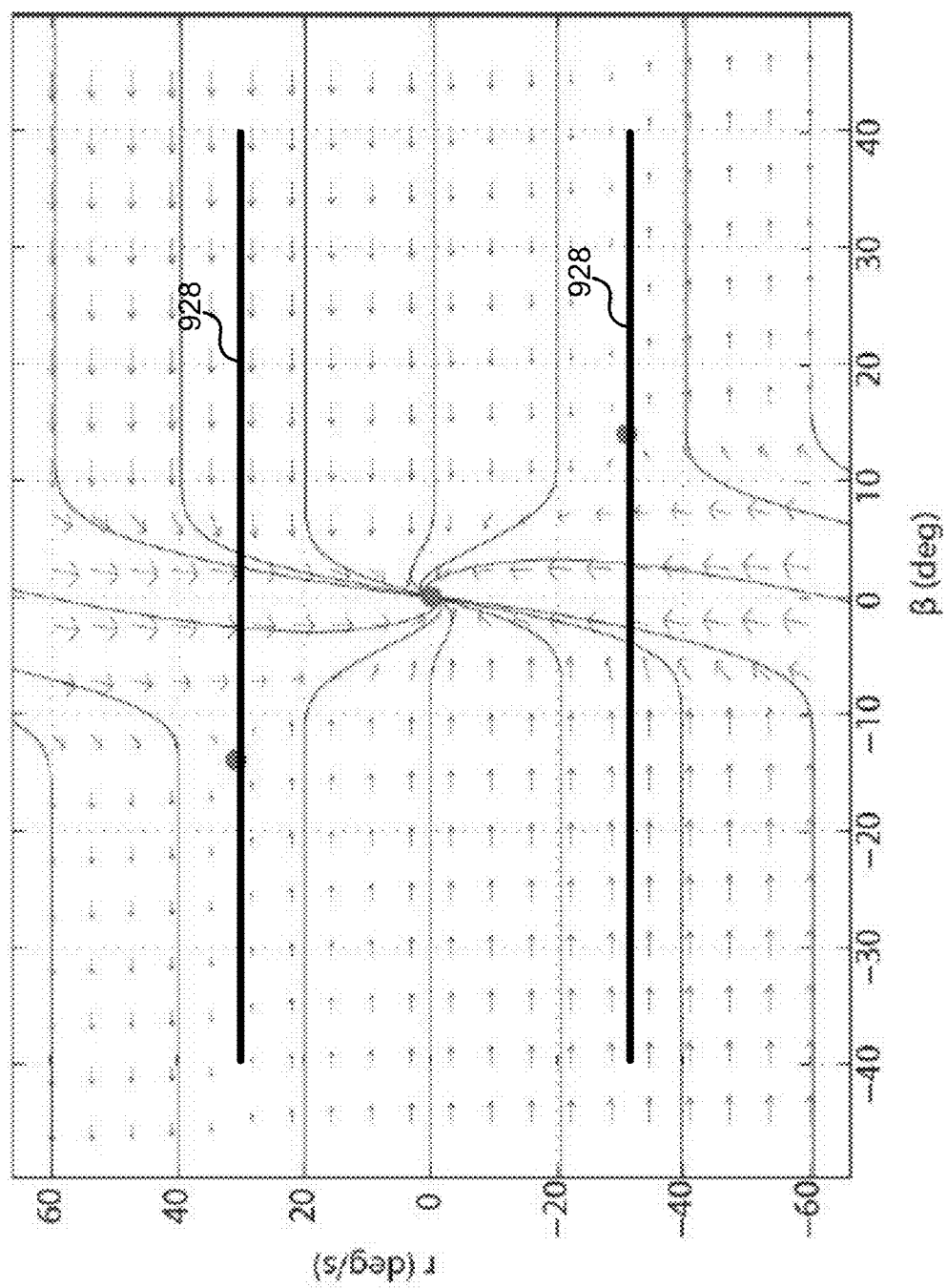
FIG. 9 illustrates that the saddle equilibria lie on the lines of maximum and minimum steady-state yaw rate, which is dependent on friction and speed.

FIG. 9 illustrates reaches of instability in the example illustrated in FIG. 8. This shows regions of instability 911 for high levels of yaw rate and sideslip that can be defined based on the equilibrium points. The center equilibrium 912 illustrates a stable (focus) equilibrium. The other equilibrium points 914 define the drift (saddle) equilibria beyond which, instabilities occur.

Figure 10:
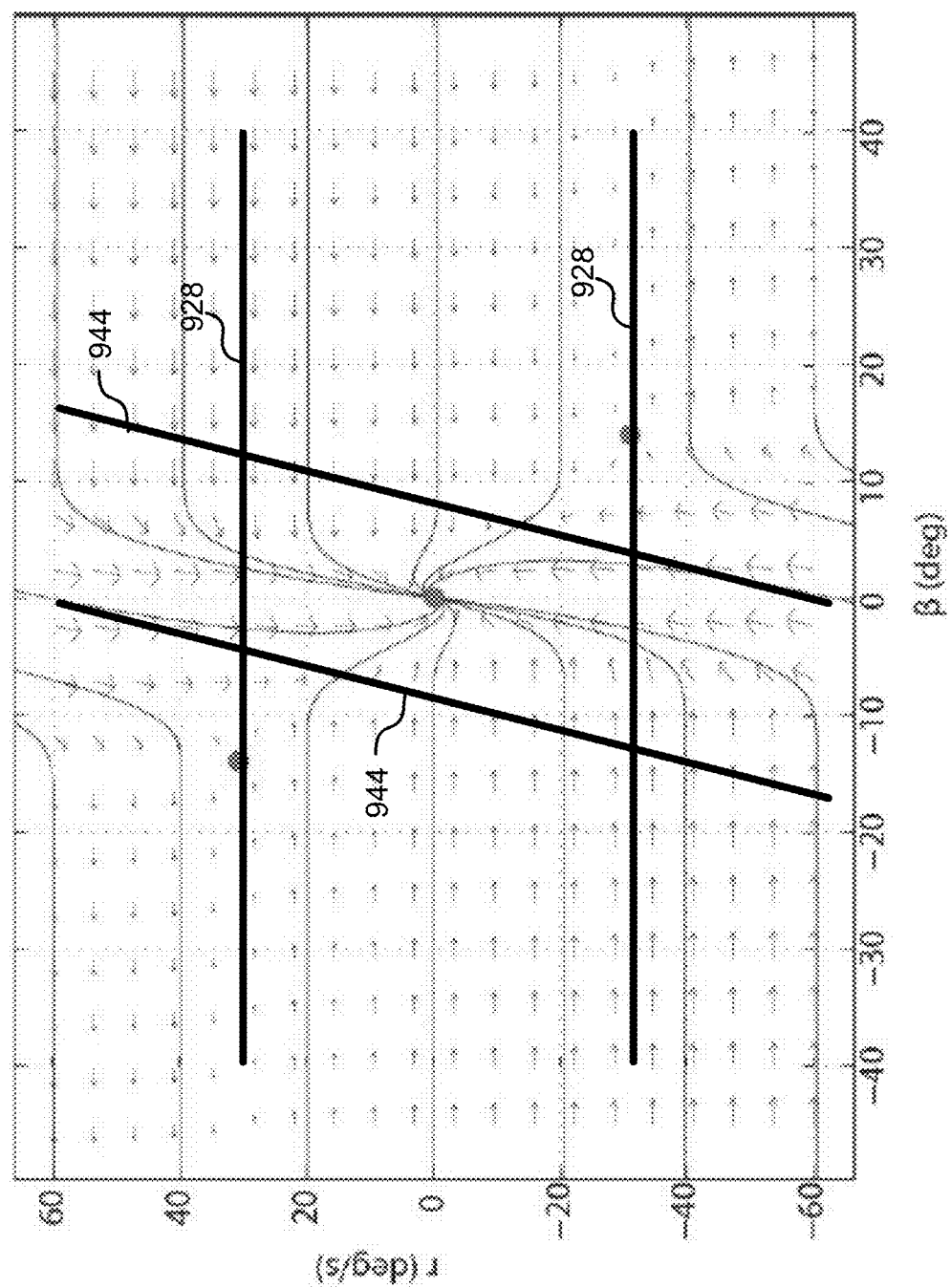
FIG. 10 illustrates an example of lines of maximum and minimum rear slip angle overlaid onto the diagram of FIG. 9.

One simple choice of boundary is a direct, constant limit on one of the states, which prevents the vehicle from entering a region of instability. For example, a yaw rate boundary at the maximum steady state yaw rate (which is constant for a given speed and friction) prevents the vehicle from increasing in yaw rate past an unstable equilibrium point. FIG. 10 illustrates that the saddle equilibria lie on the lines of maximum and minimum steady-state yaw rate 928, which is dependent on friction and speed. While these bounds keep the trajectory away from the unstable regions of the phase plane, they still allow one of the states to grow beyond the normal operating range of the vehicle. With the envelope consisting of maximum steady state yaw rate bounds, for example, the sideslip is unbounded. Any unusually large growth in sideslip angle could alarm the driver or create a dangerous situation.

A close boundary in a diagram prevents growth of the slip state. FIG. 10 illustrates the lines of maximum and minimum rear slip angle 944 overlaid onto the diagram of FIG. 10. The lines of maximum rear slip angle 944 determine areas of rear tire saturation. This forms a parallelogram in the state space as given by the following equations:

$$r_{max,ss} = \frac{\mu g}{V_x}$$

$$r_{min,ss} = -\frac{\mu g}{V_x}$$

$$\beta_{a_r,max} = \frac{br}{V_x} + \tan(\alpha_{sl,r})$$

$$\beta_{a_r,min} = \frac{br}{V_x} - \tan(\alpha_{sl,r})$$

Where first 2 equations identify the maximum and minimum yaw rates, and the $2^{nd}$ equation identifies the maximum and minimum slip angles. While these boundaries encompass a large region of the stable state space and normal operating range, they prevent the vehicle from reaching yaw rates above steady state, which may occur in transient maneuvers. This can result in a degradation of cornering feel, and also causes the controller to fight against the natural, stable, transient dynamics.

Figure 11:
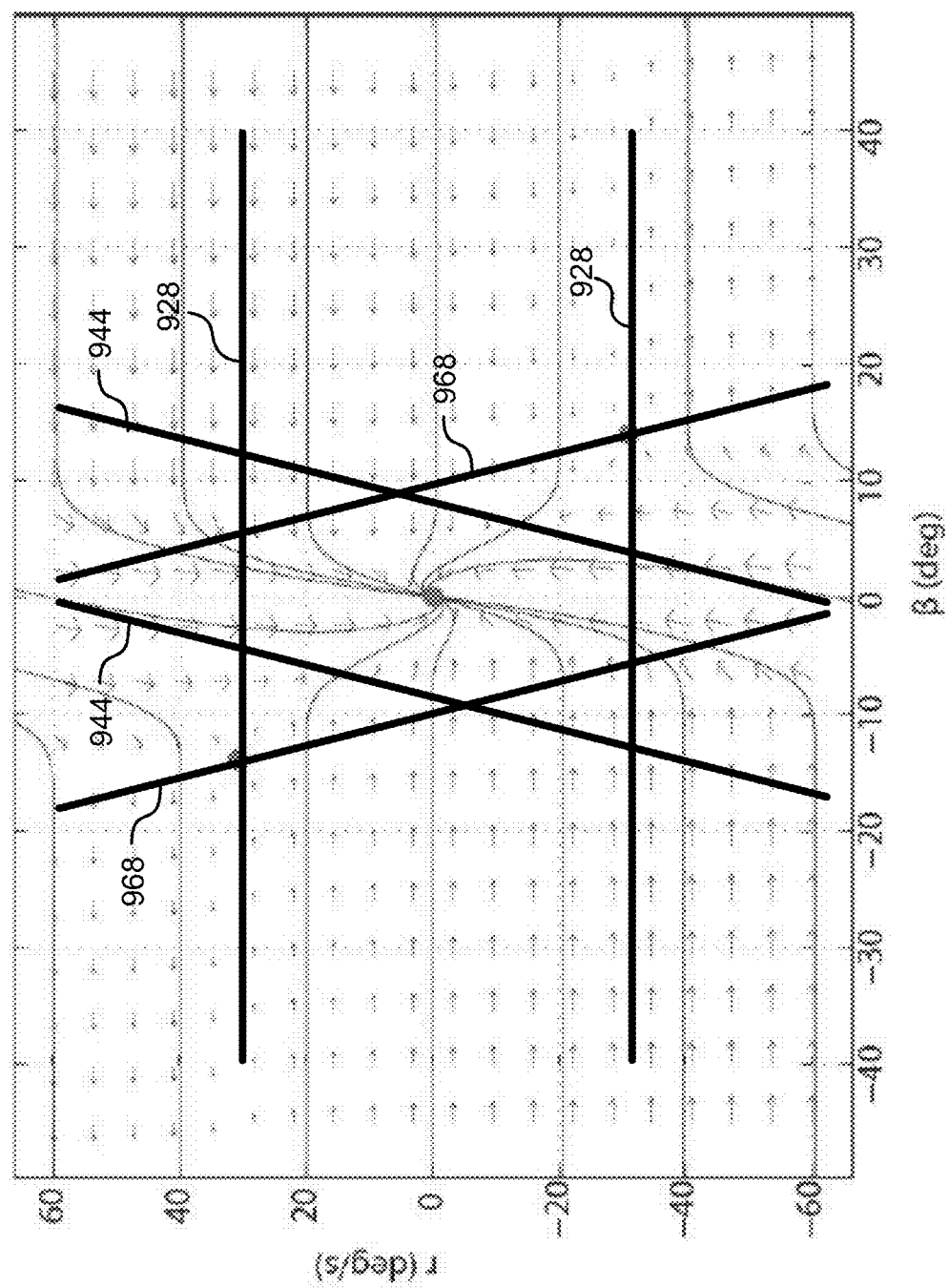
FIG. 11 illustrates an example of lines of maximum and minimum front slip angle overlaid onto the diagram of FIG. 9.
Figure 12:
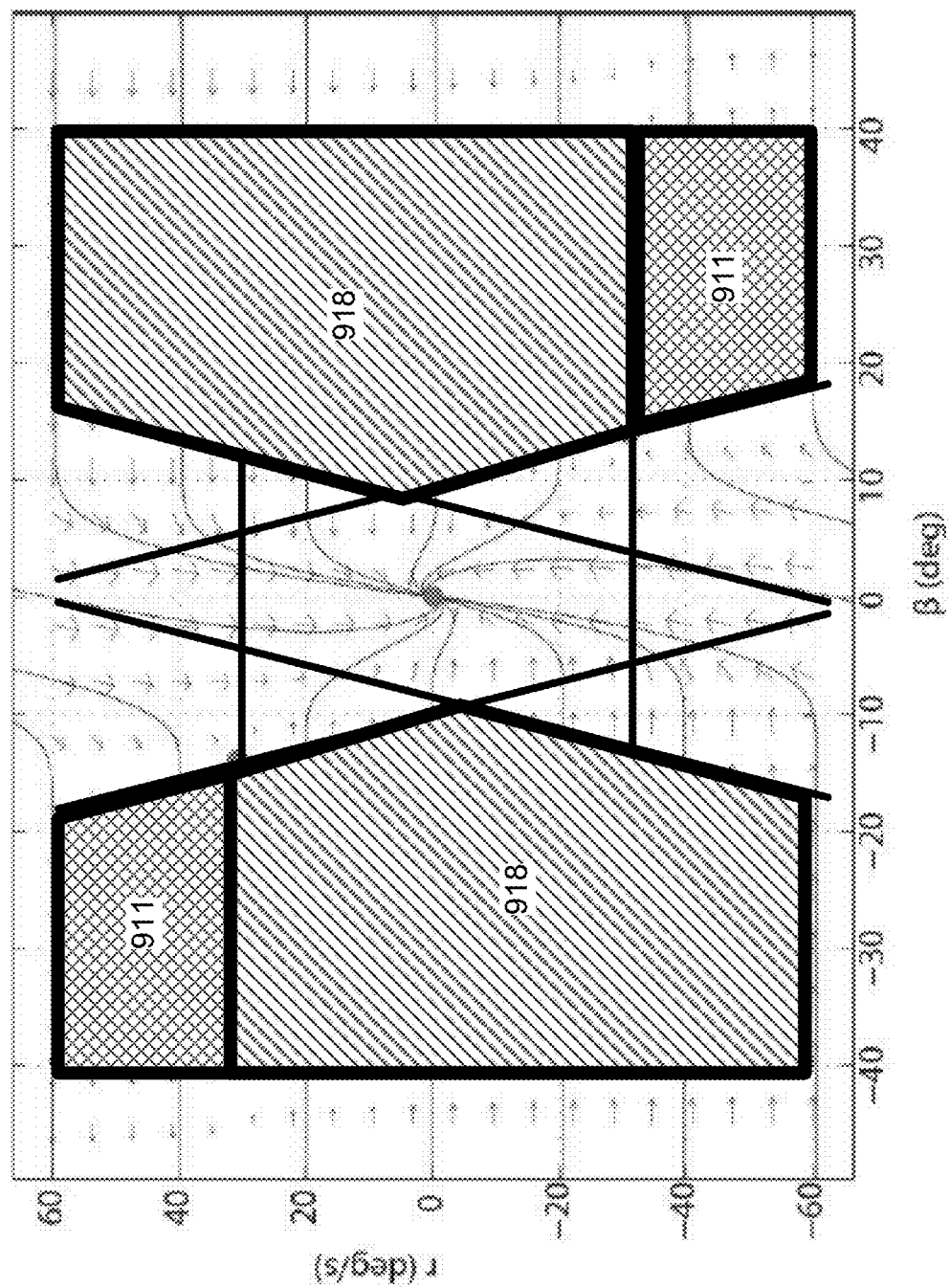
FIG. 12 illustrates an example of areas in which all tires are saturated in the example of FIG. 11.

FIG. 11 illustrates the lines of maximum and minimum front slip angle overlaid onto the diagram of FIG. 10. This illustrates that the saddle equilibria lie on the lines of maximum front slip angle 968. FIG. 12 illustrates where all tires are saturated in the example of FIG. 11. FIG. 12 shows unstable regions 911 and open loop stable regions 918.

Instead of using the maximum steady state yaw rate as a boundary, another choice is a boundary that limits yaw rate while allowing the transient overshoot dynamics. This boundary should be as consistent with the natural dynamics as possible. The maximum stable steering angle for a given speed and friction denotes the steering angle at which a bifurcation of the equilibrium points occurs and the vehicle becomes globally unstable. The line corresponding to the linearized r=0 nullcline at a steering angle of δ max (e.g., maximum stable steering angle) encapsulates a majority of the stable open loop trajectories of the vehicle in the yaw direction of the phase plane. By choosing this nullcline as the boundary, the yaw rate is allowed to grow to its stable maximum with natural overshoot. Outside the envelope, the open loop dynamics for stable steering angles already serve to push the car back in the direction of the boundary due to the change in sign of the yaw acceleration at the nullcline. This line also follows the angle of the trajectories in the phase plane at a steering angle of δ max, which suggests that any command given by the controller along the boundary will resemble the open loop steer angle. The maximum rear slip angle limits bound the stable trajectories in the sideslip direction; however, skilled drivers may prefer a slightly wider sideslip boundary to allow drifting.

Figure 13:
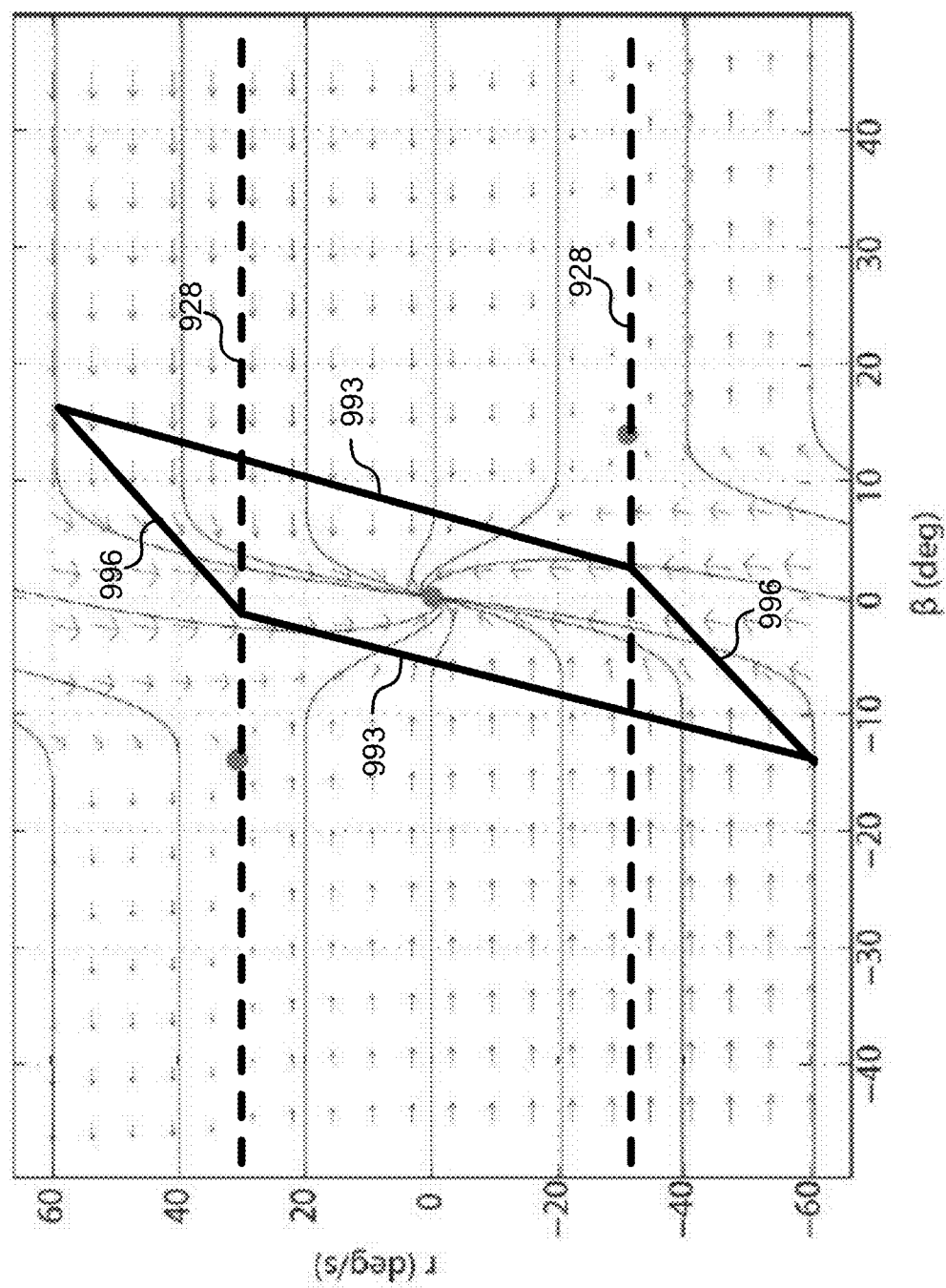
FIG. 13 illustrates an example of a nullcline envelope definition.

FIG. 13 illustrates a nullcline envelope definition. This shows the yaw acceleration nullcline 996 at the maximum steering angle. This defines the boundaries within which stability is insured and natural dynamics are respected. This boundary shape is called the Nullcline Boundary, because the yaw rate limit is defined as the linear approximation of the maximum stable yaw acceleration nullcline. The boundary does not change with steering angle if speed and friction are held constant. Segments 993 show the maximum and minimum rear slip angles to prevent sliding within the boundaries set by the yaw acceleration nullcline. This envelope can be used to identify the balance within which the vehicle is in a safe region of state space where sideslip is limited to prevent sliding and yaw rate is limited to maintain natural overshoot dynamics and steering controllability. Note that these boundaries do collapse as speed or friction goes to zero, so the boundary must be held to a non-zero quadrilateral region as this occurs; for example, by freezing the boundaries as speed or friction drops below a predetermined value.

Figure 14:
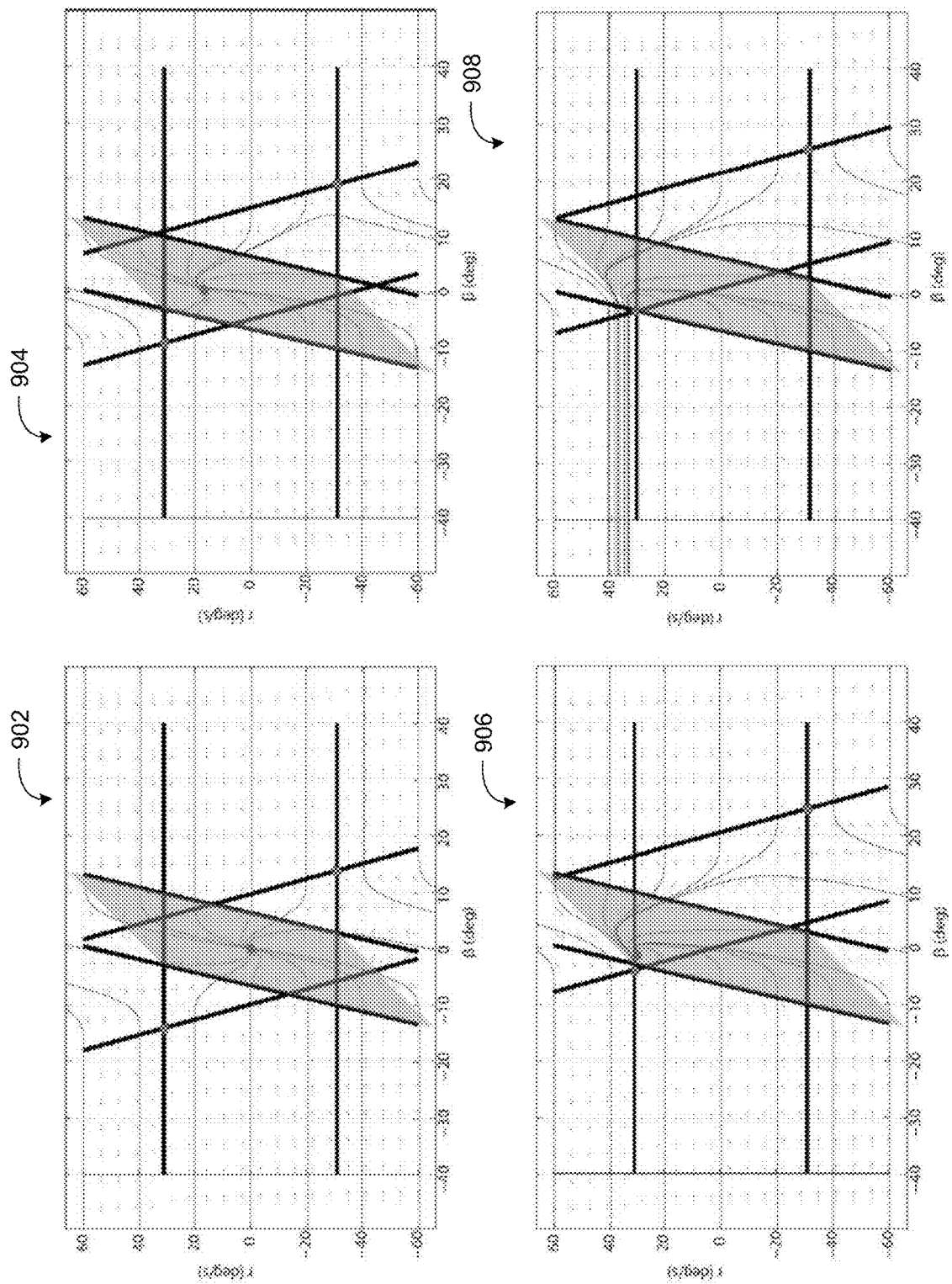
FIG. 14 illustrates an example of the stability envelope over varying steering angle dynamics.

FIG. 14 illustrates the stability envelope over varying steering angle dynamics. This example illustrates steering angle of 0° 902, 5° 904, 10° 906, and 11° 908. The yaw rate is bounded by the r nullcline at the maximum stable steering angle, while sideslip is bounded by the maximum rear slip angle. The envelope respects the natural dynamics (yaw overshoot).

In addition to performance envelopes, secondary envelopes can also be implemented to further bound the controller. For example, actuation envelopes can be used to ensure that vehicles will not receive any infeasible commands. Vehicle actuator limits can be provided to the controller so that the controller avoids commands that are beyond actuator limits. As another example, comfort envelopes can be used to guarantee that the vehicle provides a certain feel to the driver and its documents. For example, comfort envelopes can define limits on acceleration, lateral acceleration, jerk, and so on to provide a comfortable ride. These envelopes may be narrower than the performance envelopes described above.

Figure 15:
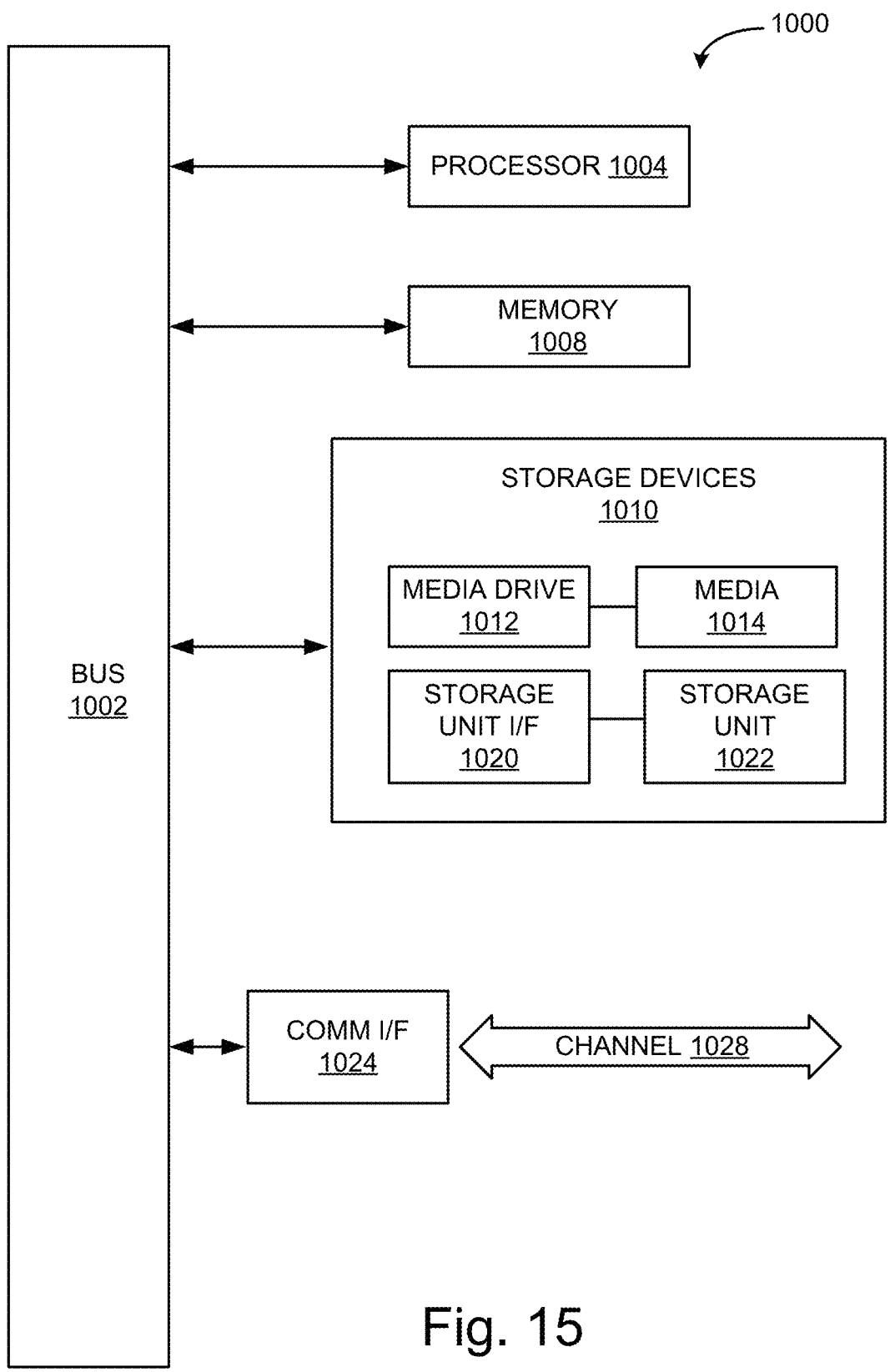
FIG. 15 illustrates an example computing system with which embodiments may be implemented.

As used herein, a circuit or module might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 15. Various embodiments are described in terms of this example-computing system 400. After reading this description, it will become apparent to a person skilled in the relevant art how to implement the technology using other computing systems or architectures.

Referring now to FIG. 15, computing system 1000 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 1000 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 1000 might include, for example, one or more processors, controllers, control modules, or other processing devices, such as a processor 1004. Processor 1004 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 1004 is connected to a bus 1002, although any communication medium can be used to facilitate interaction with other components of computing system 1000 or to communicate externally.

Computing system 1000 might also include one or more memory modules, simply referred to herein as main memory 1008. For example, in some embodiments random access memory (RAM) or other dynamic memory, might be used for storing information and instructions to be executed by processor 1004. Main memory 1008 might also be used for storing temporary variables or other intermediate information during execution of instructions to be executed by processor 1004. Computing system 1000 might likewise include a read only memory ("ROM") or other static storage device coupled to bus 1002 for storing static information and instructions for processor 1004.

The computing system 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a floppy disk drive, a magnetic tape drive, an optical disk drive, a CD or DVD drive (R or RW), a flash drive, or other removable or fixed media drive might be provided. Accordingly, storage media 1014 might include, for example, a hard disk, a floppy disk, magnetic tape, cartridge, optical disk, a CD or DVD, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing system 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a flash drive and associated slot (for example, a USB drive), a PCMCIA slot and card, and other fixed or removable storage units 1022 and interfaces 1020 that allow software and data to be transferred from the storage unit 1022 to computing system 1000.

Computing system 1000 might also include a communications interface 1024. Communications interface 1024 might be used to allow software and data to be transferred between computing system 1000 and external devices. Examples of communications interface 1024 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 1000 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A process for vehicle control, comprising:
providing, by a vehicle controller, an initial friction estimate as input to calculate bounding envelopes;
receiving, by the vehicle controller, the bounding envelopes as feedback, wherein the bounding envelopes are dynamically defined by the initial friction estimate;

comparing actual vehicle behavior to the bounding envelopes defined by the initial friction estimate, wherein comparing comprises evaluating operation behavior of the vehicle approaching edges of the bounding envelope;

in response to determining a mismatch between the actual vehicle behavior and the boundary envelopes, adjusting, by the vehicle controller, the friction estimate based on dynamically allocating a plurality of friction bins comprising a range of friction estimates, and testing the range of friction estimates in each of the plurality of friction bins and the bounding envelopes to be received as feedback, wherein determining the mismatch comprises determining that actual vehicle states associated with the operation behavior of the vehicle are not approaching the edges of the bounding envelope as defined;

providing, by the vehicle controller, the adjusted friction estimate as feedback to recalculate the bounding envelopes; and executing autonomous control of a vehicle, by the vehicle controller, a vehicle control and stabilization action based on the adjusted friction estimate and the recalculated bounding envelope.

2. The process of claim 1, wherein a mismatch comprises bounding envelopes associated with dynamics that continuously do not reach bounds of the bounding envelope.

3. The process of claim 1, wherein a mismatch comprises bounding envelopes associated with dynamics that continuously exit the bounds of the bounding envelope.

4. The process of claim 1, wherein a mismatch comprises the actual vehicle behavior near the edges of the bounding envelope not matching an expected behavior based on the friction estimate.

5. The process of claim 1, wherein the mismatch comprises reaching the bounds of the bounding envelope prior to an early threshold.

6. The process of claim 1, wherein the mismatch comprises reaching the bounds of the bounding envelope after a late threshold.

7. The process of claim 1, further comprising:
in response to determining a mismatch between the actual vehicle behavior and the boundary envelopes, creating a plurality of friction bins to evaluate a plurality of friction ranges;
assigning each of the plurality of friction ranges to a corresponding one of the plurality of friction bins; and
selecting a friction bin from the plurality of friction bins based on the evaluation of each friction range corresponding to each friction bin, wherein the selected friction bin bounds a vehicle state response based on the bounding envelopes received as feedback.

8. The process of claim 7, wherein the adjusted friction estimate is adjusted based on the friction ranges of the selected friction bin.

9. The process of claim 8, wherein providing the readjusted friction estimate as feedback to recalculate the bounding envelopes to is based on the friction ranges of the selected friction bin.

10. The process of claim 7, wherein the plurality of friction ranges are expected ranges of friction that the bounding envelopes are robust under.

11. The process of claim 7, wherein the plurality of friction bins are divided evenly within an operating range of friction for the vehicle.

12. The process of claim 1, wherein comparing the actual vehicle behavior to the bounding envelopes uses a least squares algorithm.

13. A process for friction estimation, comprising:
providing, by a vehicle controller, an initial friction estimate as input to calculate bounding envelopes;
receiving, by the vehicle controller, the bounding envelopes as feedback, wherein the bounding envelopes are dynamically defined by the initial friction estimate;
in response to determining a mismatch between an actual vehicle behavior and the boundary envelopes, dynamically creating, by the vehicle controller, a plurality of friction bins to test a plurality of friction ranges, wherein determining the mismatch comprises determining that actual vehicle states associated with an operation behavior of the vehicle are not approaching one or more edges of the bounding envelope as defined;
assigning, by the vehicle controller, each of the plurality of friction ranges to a corresponding one of the plurality of friction bins;
evaluating, by the vehicle controller, dynamics corresponding to each of the friction ranges in each of the plurality of bins; and
selecting, by the vehicle controller, a friction bin from the plurality of friction bins based on the evaluation of each friction range corresponding to each friction bin, wherein the selected friction bin bounds a vehicle state response based on the bounding envelopes received as feedback;
adjusting, by the vehicle controller, the friction estimate based on the bounding envelopes received as feedback and the friction ranges of the selected friction bin; and
executing autonomous control of a vehicle, by the vehicle controller, using a vehicle control and stabilization action based on the and the adjusted friction estimate.

14. The process of claim 13, further comprising:
for each of the plurality of friction bins, measuring a dynamic response corresponding to the operation of the vehicle for the friction bin and the assigned friction ranges, and wherein the selected friction bin is the friction bin from the plurality of friction bins that that bounds the vehicle state response based on evaluating the measured dynamic responses that result from each of the plurality of friction bins; and
providing the adjusted friction estimate as feedback to recalculate the bounding envelopes.

15. The process of claim 14, further comprising:
running a plurality of controllers, where each of the plurality of controllers is allocated for a corresponding one of the plurality of bins not selected; and
continuously comparing the actual vehicle behavior to bounds of the vehicle state responses corresponding to the plurality of friction bins not selected.

16. The process of claim 15, wherein the continually comparing for each of the plurality of friction bins not selected is run on the corresponding controller allocated for that friction bin.

17. The process of 16, further comprising:
selecting a new friction bin either from the plurality of friction bins previously not selected or the currently selected friction bin, wherein the selected new friction bin bounds a vehicle state response based on the actual vehicle behavior over time.

18. The process of claim 17, further comprising:
readjusting the fiction estimate based on the friction ranges of the selected new friction bin.

19. The process of claim 18, wherein the readjusted friction estimates correct the estimation to approximate an actual friction value that changes over time.

20. The process of claim 19, further comprising:
reallocating the plurality of friction bins to approximate the actual friction value.

\* \* \* \* \*